United States Patent
Paulsen et al.

(10) Patent No.: US 12,255,326 B2
(45) Date of Patent: Mar. 18, 2025

(54) METHODS FOR PREPARING POSITIVE ELECTRODE MATERIAL FOR RECHARGEABLE LITHIUM ION BATTERIES

(71) Applicants: UMICORE, Brussels (BE); UMICORE KOREA LTD., Cheonan-si (KR)

(72) Inventors: Jens Paulsen, Cheonan-si (KR); Shinichi Kumakura, Cheonan-si (KR); TaeHyeon Yang, Cheonan-si (KR); Dae-Hyun Kim, Cheonan-si (KR); HyeJeong Yang, Cheonan-si (KR)

(73) Assignees: UMICORE, Brussels (BE); UMICORE KOREA LTD., Cheonan-si (KR)

( * ) Notice: Subject to any disclaimer, the term of this patent is extended or adjusted under 35 U.S.C. 154(b) by 1211 days.

(21) Appl. No.: 17/041,022

(22) PCT Filed: Mar. 13, 2019

(86) PCT No.: PCT/EP2019/056210
§ 371 (c)(1),
(2) Date: Sep. 24, 2020

(87) PCT Pub. No.: WO2019/185349
PCT Pub. Date: Oct. 3, 2019

(65) Prior Publication Data
US 2021/0143423 A1    May 13, 2021

Related U.S. Application Data

(60) Provisional application No. 62/649,646, filed on Mar. 29, 2018.

(30) Foreign Application Priority Data

Jul. 9, 2018   (EP) ..................................... 18182354
Aug. 22, 2018  (EP) ..................................... 18190220

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0471* (2013.01); *H01M 4/505* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2003/0129496 A1* 7/2003 Kasai ................. H01M 4/622
429/231.1
2006/0257745 A1   11/2006 Choi et al.
(Continued)

FOREIGN PATENT DOCUMENTS

CN   103022499 A    4/2013
CN   105051945 A    11/2015
(Continued)

OTHER PUBLICATIONS

CNIPA; Office Action for Chinese Patent Application No. 201980016546.7 dated Dec. 2, 2022, 33 pages.
(Continued)

*Primary Examiner* — Amanda J Barrow
(74) *Attorney, Agent, or Firm* — NK Patent Law

(57) ABSTRACT

A method for preparing a powderous positive electrode material comprising single crystal monolithic particles and having a general formula $Li_{1+a}((Ni_z(Ni_{1/2}Mn_{1/2})_yCo_x)_{1-k}A_k)_{1-a}O_2$, wherein A is a dopant, $-0.03 \leq a \leq 0.06$, $0.05 \leq x \leq 0.35$, $0.10 \leq z \leq 0.95$, $x+y+z=1$ and $k \leq 0.05$ is described. The method comprises providing a
(Continued)

mixture comprising a Ni- and Co- bearing precursor and a Li bearing precursor, subjecting the mixture to a multiple step sintering process whereby in the final sintering step a sintered lithiated intermediate material is obtained comprising agglomerated primary particles having a primary particle size distribution with a D50 between 2.0 and 8.0 µm, subjecting the lithiated intermediate material to a wet ball milling step to deagglomerate the agglomerated primary particles and obtain a slurry comprising deagglomerated primary particles, separating the deagglomerated primary particles from the slurry, and heat treating the deagglomerated primary particles at a temperature between 300° C. and at least 20° C. below the temperature in the final sintering step.

14 Claims, 7 Drawing Sheets

(51) Int. Cl.
   *H01M 4/505*      (2010.01)
   *H01M 4/02*       (2006.01)

(56) References Cited

U.S. PATENT DOCUMENTS

| | | | |
|---|---|---|---|
| 2008/0076027 | A1 | 3/2008 | Saito et al. |
| 2009/0148772 | A1 | 6/2009 | Kawasato et al. |
| 2011/0049420 | A1 | 3/2011 | Ellenwood et al. |
| 2011/0226986 | A1 | 9/2011 | Wang et al. |
| 2011/0291044 | A1* | 12/2011 | Wang .................. H01M 4/505 252/182.1 |
| 2012/0043500 | A1 | 2/2012 | Xiang et al. |
| 2014/0018439 | A1 | 1/2014 | Gruner et al. |
| 2014/0030588 | A1 | 1/2014 | Hong et al. |
| 2014/0205898 | A1* | 7/2014 | Lee .................... H01M 4/1391 427/126.6 |
| 2014/0212759 | A1 | 7/2014 | Blangero et al. |
| 2014/0377659 | A1 | 12/2014 | Oljaca et al. |
| 2015/0228971 | A1* | 8/2015 | Kim .................... H01M 4/0402 429/231.1 |
| 2015/0311512 | A1 | 10/2015 | Paulsen et al. |
| 2016/0099469 | A1 | 4/2016 | Paulsen et al. |
| 2017/0222225 | A1* | 8/2017 | Kang ................. H01M 4/1391 |
| 2017/0309902 | A1 | 10/2017 | Jo et al. |
| 2018/0019464 | A1 | 1/2018 | Xia et al. |
| 2018/0123130 | A1 | 5/2018 | Kim et al. |
| 2018/0261842 | A1* | 9/2018 | Park ....................... H01M 4/131 |
| 2019/0221830 | A1 | 7/2019 | Do et al. |
| 2021/0399287 | A1 | 12/2021 | Xia et al. |

FOREIGN PATENT DOCUMENTS

| | | | | |
|---|---|---|---|---|
| EP | 2405511 | A2 | 1/2012 | |
| JP | 11079751 | A | 3/1999 | |
| JP | 2004119218 | A | 4/2004 | |
| JP | 2005026218 | A | 1/2005 | |
| JP | 2005332713 | A | 12/2005 | |
| JP | 2006-054159 | * | 2/2006 | ............ C01G 53/00 |
| JP | 2006054159 | A | 2/2006 | |
| JP | 2006228733 | A | 8/2006 | |
| JP | 2014523840 | A | 9/2014 | |
| JP | 2015-149160 | A | 8/2015 | |
| JP | 2016162748 | A | 9/2016 | |
| JP | 2017536654 | A | 12/2017 | |
| KR | 10-2011-0086817 | A | 8/2011 | |
| KR | 10-2012-0061910 | A | 6/2012 | |
| KR | 101547972 | | 8/2015 | |
| KR | 10-2017-0118091 | A | 10/2017 | |
| WO | 2007108611 | A1 | 9/2007 | |
| WO | 2008084679 | A1 | 7/2008 | |
| WO | 2016116862 | A1 | 7/2016 | |
| WO | 2017013520 | A1 | 1/2017 | |
| WO | 2017042654 | A1 | 3/2017 | |
| WO | 2017042655 | A1 | 3/2017 | |
| WO | 2017168274 | A1 | 10/2017 | |
| WO | 2018158078 | A1 | 9/2018 | |

OTHER PUBLICATIONS

CNIPA; Office Action for Chinese Patent Application No. 201980016459.1 dated Nov. 18, 2022, 17 pages.
USPTO; Non-Final Office Action for U.S. Appl. No. 16/955,906 dated May 7, 2021.
EPO; Supplementary European Search Report for European Patent Application No. EP19761326 dated Dec. 20, 2021, 2 pages.
USPTO, Non-final Office Action for corresponding U.S. Appl. No. 17/007,464, dated Nov. 1, 2023, 19 pages.
ISA/EP; International Search Report and Written Opinion for International Patent Application No. PCT/EP2019/056210 dated Apr. 10, 2019, 11 pages.
WIPO; International Preliminary Report on Patentability for International Patent Application No. PCT/EP2019/056210 dated Jul. 7, 2020, 19 pages.
USPTO; Non-Final Action for U.S. Appl. No. 16/976,879, dated Jun. 29, 2023, 39 pages.
USPTO; Non-Final Action for U.S. Appl. No. 16/976,884, dated Jun. 20, 2023, 37 pages.
USPTO, Final Office Action for corresponding U.S. Appl. No. 17/007,464, dated Mar. 7, 2024, 26 pages.
USPTO, Non-Final Office Action for U.S. Appl. No. 17/007,464, dated Sep. 28, 2024, 30 pages.

* cited by examiner

5μm

5μm

1μm

10μm

METHODS FOR PREPARING POSITIVE ELECTRODE MATERIAL FOR RECHARGEABLE LITHIUM ION BATTERIES

CROSS-REFERENCE TO RELATED APPLICATIONS

This application is a U.S. National Stage application of International Patent Application No. PCT/EP2019/056210, filed on Mar. 13, 2019, which claims the benefit of European Patent Application No. 18190220.6, filed on Aug. 22, 2018, and the benefit of European Patent Application No. 18182354.3, filed on Jul. 9, 2018, and the benefit of U.S. Provisional Patent Application No. 62/649,646, filed on Mar. 29, 2018.

TECHNICAL FIELD AND BACKGROUND

Modern batteries, especially used for automotive applications, require high energy density as well as long cycle life. Due to cost of batteries and energy density requirements, currently, the so-called NMC or NCA are the dominating positive electrode materials in batteries for automotive applications. NMC is an abbreviation for the lithium nickel-manganese-cobalt oxide compound.

The state of the art NMC, high Ni NMC, very high Ni NMC or NCA compounds are powders comprised of dense secondary particles, usually of spherical shape, comprised of small primary particles, and having the general formula $Li_{1+a}(Ni_z(Ni_{0.5}Mn_{0.5})_yCo_x)_{1-a}O_2$. Here the definition of high Ni NMC is a NMC of which Ni-excess (1-x-y, referred as "z") is at least 0.4 and smaller than 0.7. Very high Ni NMC is defined as a NMC of which z is at least 0.7. NCA is a lithium nickel-cobalt-aluminum oxide with the formula of $Li_{1+a}(Ni_{1-x'-y'}Co_{y'}Al_{x'})_{1-a}O_2$. The median size (of a volume distribution, referred as D50 hereafter) of secondary particles is typically between 5 to 15 µm. Sometimes D50 can be less (about 3 µm) for high power applications or larger but typically not larger than 20 µm. The primary particles are typically 0.5 µm or smaller. This morphology can be defined as "polycrystalline", and this state of the art morphology is the result of a long development history of positive electrode materials.

To produce a positive electrode material, generally a transition metal precursor is blended with a lithium (Li) precursor and fired in an oxidizing atmosphere. The goal is to obtain a positive electrode material with a proper Li stoichiometric, having the correct layered crystal structure and having a proper degree of crystallinity. Additionally, impurities need to be low or controlled to a certain desired level. In the state of the art polycrystalline positive electrode material, generally the sintering is a quite gentle process and the shape of the precursor is preserved. Also, the transition metal composition of the precursor remains in the positive electrode material. Therefore, for state of the art NMC, high Ni NMC, very high Ni NMC as well as NCA, most aspects of product design are tackled already at the transition metal precursor stage.

As explained above, generally, shaped transition metal precursors are applied for the state of the art production. This route has disadvantages as well as advantages. An advantage is that the shaped transition metal precursors are a tool to design the final positive electrode material. For example, a dense spherical polycrystalline morphology can be achieved from this route. Otherwise, with respect to logistics, it is preferred to design the property of positive electrode materials such as particle size distribution (PSD) or morphology at a later stage in a process because there will always be different requirements depending on the application. For example, a positive electrode material having a small D50 can be used for power applications and a material having a high pressed density can be used for a high energy applications. The logistics become very difficult if there are many different grades, as each grade will require a dedicated shaped transition metal precursor. Therefore, it is desired that one transition metal precursor meets the requirements of all final products. This is called precursor unification and will require a process where the final product is designed in a later process step.

The almost exclusively applied process to prepare shaped mixed transition metal precursors is a co-precipitation process. Generally, flows of metal solutions (usually transition metal sulfates) and a caustic base solution (usually NaOH) are fed into a reactor and transition metal hydroxide precipitates, which is separated from the solution and dried.

Another potential approach to achieve shaped precursors is to apply a spray drying process as shaping step. During spray drying, droplets of a slurry with fine dispersed transition metal oxide, hydroxide or carbonate are sprayed into a hot zone. After evaporation of the solvent, a shaped transition metal precursor can be obtained. The spray drying process would not be required if a sintering process which utilizes non-shaped transition metal precursors exists. Therefore, the use of non-shaped transition metal precursors potentially can reduce process cost. A particularly interesting non-shaped precursor is a spray pyrolyzed mixed transition metal oxide prepared by the spray pyrolysis of sulfate or chloride solutions. Compared to co-precipitation, spray pyrolysis could be a waste free process. The spray pyrolysis of nitrate solutions is of potential interest too if it is possible to recycle nitric acid sufficiently.

In a normal co-precipitation reaction, 1 mole of $Na_2SO_4$ solution is created as waste solution to produce 1 mole of mixed transition metal hydroxide following the reaction scheme: $2NaOH+M'SO_4 \rightarrow M'(OH)_2+Na_2SO_4$, where M' are transition metals such as Ni, Mn, and Co. This can be translated into about 1.5 kg $Na_2SO_4$ per 1.0 kg $M'(OH)_2$. Contrary to this, a pyrolysis process can be implemented with much less waste, due to the possibility to use the acid which has been created to dissolve the transition metal precursor. The pyrolysis step is of interest as it is capable to supply transition metal precursors where transition metals are well mixed at atomic scale. The reaction equation below is idealized to emphasize the closed loop approach. In the equation, Me stands for a mixture of Ni, Co and Mn raw materials which are generally not mixed at atomic scale, whereas Me' indicates that transition metals are well mixed at atomic scale in a solution or in the product.

1) Raw material (oxide) dissolution: $2HCl+MeO \rightarrow Me'Cl_2+H_2O$

2) Pyrolysis yielding well-mixed transition metal oxide: $Me'Cl_2+H_2O \rightarrow Me'+2HCl$ (gas)

3) Recycling: HCl(gas) → HCl(liquid) and re-use HCl (liquid) in reaction 1)

A pyrolysis process is typically not able to deliver well shaped precursors. However, it would be a very preferred precursor if a process which utilizes non-shaped transition metal precursor is developed.

The purity of transition metal precursors matters. A co-precipitated transition metal hydroxide precursor, for example, might contain some sulfate ($SO_4$) impurity which originates from the $M'SO_4$ flow used in the co-precipitation reaction. During sintering with a Li precursor, most of the $SO_4$ persists in the form of $Li_2SO_4$. A certain small content of $Li_2SO_4$ is beneficial for some applications. However, the $SO_4$ content in the final positive electrode material should not exceed 1 mol % compared to M' in the product, since the reversible capacity can be reduced because electrochemically inactive $Li_2SO_4$ becomes dominating. This puts a limit to the impurities in a transition metal precursor.

An industrial pyrolysis is a very fast process lasting few seconds. If the temperature is too low, not all sulfate or chlorine (Cl) reacts and the transition metal precursor can have a significant level of impurities. These impurities might even remain after increasing the pyrolysis temperature or washing and filtering of the obtained transition metal oxide. These impurities need to be removed at a later processing step. One possibility is to apply an intermediate or final washing to a final positive electrode material, since in the final product, sulfate or chlorine are present as soluble LiCl or $Li_2SO_4$. However, this intermediate washing step increases process cost.

Achieving high quality positive electrode materials in a process with high overall thruput is increasingly difficult with increasing Ni content. If the Ni content (calculated from Ni/M' in mol/mol) is higher than 0.7, for example, it is nearly impossible to use the cheap and easily accessible lithium carbonate ($Li_2CO_3$) as Li precursor during the sintering process, and a pure oxygen atmosphere is needed instead of air. Very high Ni NMC and NCA compounds require LiOH or $Li_2O$ instead of $Li_2CO$ as Li source. Also, additional sintering steps are needed or the sintering needs to be performed with low thruput. Moreover, the requirements for the purity of the transition metal precursors—such as their carbonate content—become more stringent. Finally, very high Ni NMC and NCA compounds are much more air sensitive than a (lower Ni content) NMC compound. All these difficulties significantly increase the process cost of very high Ni and NCA. Therefore, for very high Ni NMC or NCA, a preparation process will always be a compromise between product performance and process cost.

Recently, a new type of NMC, called "monolithic", starts to emerge, abandoning the concept of the polycrystalline compounds from shaped precursors. In its ideal form, the powder consists of dense "monolithic" particles, where each particle does not consist of primary particles but is a single crystal itself. Monolithic compounds are also named single crystal or one-body compounds. Overall, the concept of monolithic positive electrode material is not new. For example, $LiCoO_2$ (LCO) which is used in portable batteries as a positive electrode material is often of monolithic morphology, with single crystal particles having a D50 of around 20 µm. Their morphology is often called "potato shape" due to its irregular particle shape. This shape can be seen as typical for a monolithic NMC as well. A potato shape allows—compared with polycrystalline compounds;

1) To reduce surface area. Less specific surface area of a charged compound in a battery has the benefit of less side reactions and better safety as the area where reactions between electrolyte and positive electrode materials can occur is reduced.

2) Better packaging density. The smooth surface and the irregular potato shape allows a dense powder packing. For example, during electrode processing, with relatively small force, denser electrodes can be achieved. This increases the energy density of a battery and also reduces the amount of electrolyte required.

3) High particle strength. The particles can better withstand mechanical strain caused by volume changes during cycling in a battery, leading a better cycle stability.

Compared to LCO, it is less easy for NMC compounds (or high Ni NMC, very high Ni, NCA) to achieve the monolithic morphology. Generally, a higher sintering temperature or higher Li excess is required to achieve the monolithic morphology compared to the polycrystalline morphology, because these factors promote the growth of primary particles. However, primary and secondary particles of NMC compounds tend to agglomerate strongly, forming agglomerated blocks that are difficult to de-agglomerate (mill), and the milled agglomerates can have a poor morphology after a strong milling process. Whereas a desired monolithic NMC compound has uniform PSD, these milled agglomerates have a broad PSD showing pronounced large and small particle tails. Due to the presence of very big and very small particles, the obtained reversible capacities are much lower than known polycrystalline materials, and a relatively poor cycle stability is observed. Therefore, polycrystalline positive electrode materials have completely dominated over monolithic materials for decades. It is very challenging to develop processes which allow to achieve a monolithic morphology of high quality.

The properties of positive electrode materials depend on bulk properties like bulk Li diffusion, stability of the bulk against structural collapse, and brittleness. Important design parameters are metal composition, strain, crystallinity, and surface properties. Surface coatings apply a protective film onto the surface. Surface coatings followed by a heat treatment can result in gradient type surface modifications. These surface modifications can contribute to enhanced stability of the positive electrode material in the electrolyte.

Alternatively, the charge transfer resistance can be modified. Especially, gradient modifications can prevent crack formation, leading to a good cycle stability. A typical example of a coating is an Al based coating. Whereas surface coatings or gradient type surface modifications have the potential to improve performances, they generally require additional processing steps which increase process cost.

It is an object of the present invention to provide a dedicated method for preparing a powderous positive electrode material comprising single crystal monolithic particles to address the above mentioned requirements of such material and a process to make it.

SUMMARY OF THE INVENTION

The current invention provides a process to produce monolithic positive electrode materials that contains a wet milling step, that can be combined with many other process steps—for example in-situ coating, removal of base, removal of impurities, and gradient coating, with minor increase of cost and complexity of the process.

Viewed from a first aspect, the invention can provide a method for preparing a powderous positive electrode material comprising single crystal monolithic particles comprising Ni and Co and having a general formula $Li_{1+a}((Ni_z(Ni_{1/2}Mn_{1/2})_y Co_x)_{1-k} A_k)_{1-a} O_2$, wherein A is a dopant, $-0.03 \leq a \leq 0.06$, $0.05 \leq x \leq 0.35$, $0.10 \leq z \leq 0.95$, $x+y+z=1$ and $k \leq 0.05$, the method comprising the steps of providing a mixture comprising a Ni- and Co- bearing precursor and a Li bearing precursor, subjecting the mixture to a multiple step sintering process whereby in the final sintering step a sintered lithiated intermediate material is obtained comprising agglomerated primary particles having a primary particle size distribution with a D50 between 2.0 and 8.0 µm, subjecting the lithiated intermediate material to a wet ball milling step whereby the agglomerated primary particles are deagglomerated and a slurry comprising deagglomerated primary particles is obtained, separating the deagglomerated primary particles from the slurry, and heat treating the deagglomerated primary particles at a temperature between 300° C.—or even 500° C.—and a temperature that is at least 20° C. below the temperature in the final sintering step of the multiple step sintering process, whereby single crystal monolithic particles comprising Ni and Co are obtained. For example, if the final sintering temperature was 900° C., the heat treatment temperature may be at a temperature between 500 and less than 880° C. If the temperature in the final heat treating step is too high sintering will again occur. Therefore the upper limit of the temperature may even be limited to 850° C. The definition of "wet ball milling" in this invention is a process to de-agglomerate primary particles by the impact of beads in a solvent which is water. The wet ball milling may be a "conventional ball milling" in a solvent as well as a "conventional bead milling" in a solvent. A conventional ball milling process is performed with a rotating vessel and no agitator, where a conventional bead milling process is performed with a rotating agitator in a stationary vessel. In an embodiment y can vary between 0 and 0.50. In another embodiment $0.35 \leq z \leq 0.95$. The multiple step sintering process may be followed by a jaw crushing step to decrease the particle size of the sintered lithiated intermediate material.

The Ni- and Co- bearing precursor may have a particle size distribution with a D50 10 μm, as this size is easier to obtain in a standard co-precipitation process used for this type of precursors. The precursor may then be a mixed transition metal based hydroxide or oxyhydroxide. But also, the Ni- and Co- bearing precursor may be obtained from a pyrolysis process of a Ni- and Co- bearing sulfate or chloride solution.

The Ni- and Co- bearing precursor may comprise Mn. If the Ni- and Co- bearing precursor comprises Mn, then y>0, in particular 1-x-z≥y>0.

In a more elaborate method wherein in the mixture comprising a Ni- and Co- bearing precursor and a Li bearing precursor the Li to transition metal ratio is between 0.65 and 0.95, the multiple step sintering process comprises the following sub-steps:

a first sintering step in an oxidizing atmosphere at a temperature between 650 and 850° C., for a time between ⅓ and 15 hours, thereby obtaining a lithium deficient precursor powder, mixing the lithium deficient precursor powder with either one of LiOH, $Li_2O$ and $LiOH \cdot H_2O$, thereby obtaining a second mixture whereby the mixture has a Li to transition metal ratio is between 0.95 and 1.10, and sintering the second mixture in an oxidizing atmosphere at a temperature between 800 and 1000° C., for a time between 6 and 36 hours. In an embodiment the first sintering step may be performed in a rotary kiln with a residence time between ⅓ and 3 hours.

In a particular embodiment between the step of subjecting the mixture to a multiple step sintering process and the wet ball milling step a dry milling step is performed in an air classifying mill or an air jet mill. This step may be used to break up small agglomerated pieces issuing from the multiple step sintering process into even smaller agglomerates, i.e. having a maximum size (D100) of 200 μm, because it could increase the milling thruput.

The wet ball milling step may be performed in a solution comprising or consisting of water and between 30 and 70 wt % of lithiated intermediate material, and using either one of steel, $ZrO_2$, $Al_2O_3$ and WC beads having a diameter between 0.5 to 10 mm. The diameter of the beads may also be at least 1 mm. It may however also be that in the wet ball milling step beads of 0.2 to 5 mm and a milling speed <50 cm/s are used, depending on the size if the agglomerates issuing from the step before this final wet ball milling step. For example one particular embodiment is where the wet ball milling step is a cascade wet ball milling step performed using either one of steel, $ZrO_2$, $Al_2O_3$ and WC beads, the cascade wet ball milling step comprising a first step using beads of 10 to 50 mm—or even 30 to 50 mm—and a milling speed <20 cm/s, and a final step using beads of 0.2 to 5 mm and a milling speed <500 cm/s. In a general embodiment, the wet milling step is performed until a slurry comprising deagglomerated primary particles with a D50 between 2 and 8 μm and a span below 1.3, or between 0.9 and 1.3, or even below 1.0, is obtained.

In other embodiments in the wet ball milling step a dopant A- or Co- bearing precursor is added to the solution. This dopant A- or Co- bearing precursor may for example be either one of aluminum or cobalt hydroxide, $CoSO_4$, $Al_2(SO_4)_3$ and $NaAl(OH)_4$. It may also be that in the general method the Co- bearing precursor is either a Co-nano oxide or a cobalt salt such as $CoSO_4$, or $Co(NO_3)_2$, and the dopant A-bearing precursor is a nano oxide or salt of either one or more of Al, Mg, Zr, Nb, Si, P, Mo, Ba, Sr, Ca, Zn, Cr, V, and Ti. In another embodiment the deagglomerated primary particles separated from the slurry are dry coated with nano particles consisting of either one of $Al(OH)_3$, $Al_2O_3$, Co nitrate and a Mn doped Co oxide, before the heat treatment step.

Viewed from a second aspect, the invention can provide a powderous positive electrode material comprising single crystal monolithic particles comprising Ni and Co and having a general formula $Li_{1+a}((Ni_z(Ni_{1/2}Mn_{1/2})_yCo_x)_{1-k}A_k)_{1-a}O_2$, wherein A is a dopant, $-0.03 \leq a \leq 0.06$, $0.05 \leq x \leq 0.35$, $0.10 \leq z \leq 0.95$, x+y+z=1 and K≤0.05, the particles having a particle size distribution with a D50 between 2.0 and 8.0 μm, and with a span ≤1.5, and preferably ≤1.2. In an embodiment y can vary between 0 and 0.50. In another embodiment $0.35 \leq z \leq 0.95$.

DETAILED DESCRIPTION

Figure 1:
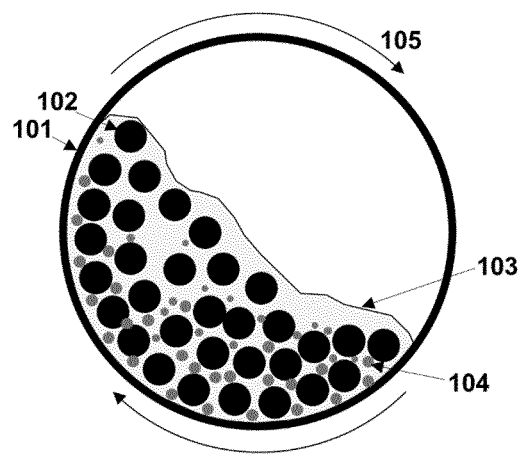
FIG. 1. Schematic image of wet ball milling process. 101—(rotating) chamber, 102—milling medium (balls), 103—solvent, 104—target powder, and 105—direction of rotation of chamber.

The invention provides a process to produce monolithic positive electrode materials, which have adapted particle size distributions and superior electrochemical properties. The process is composed of single or multiple solid state reactions, wet milling and a subsequent heat treatment.

In the invention, it is indicated that the primary particle size of sintered agglomerated compound may be at least 2 μm and at most 8 μm. Considering that the primary particle size of conventional polycrystalline NMC compounds is smaller 0.5 μm, this range of primary particle size is big. The primary particle size can be controlled by sintering temperature, sintering time, and sintering additive. The general process to produce the sintered agglomerated compound comprises the steps of mixing transition metal precursors with a Li precursor. Additional dopants, such as Al, Mg, and Zr, can be added at this stage or later in the process. The mixture is sintered by a multiple step sintering process (such as disclosed in WO2017-042654). Typical Li precursors are $Li_2CO_3$, LiOH, $LiOH \cdot H_2O$ or $Li_2O$. $Li_2CO_3$ may be applied in the first sintering step of the multiple step sintering process for higher values of z (High Ni NMC). The $CO_3$ free precursors are applied for very high Ni compounds and more in general in the final sintering step of a multiple step sintering process. The sintering is performed in an oxygen containing atmosphere, like air or oxygen. The sintering can be performed in chamber type furnace (for example a RHK (Roller Hearth Kiln)) using ceramic saggars or trays. Alternatively, the sintering, especially the first sintering step of the multiple step sintering process, can be performed in high thru-put rotary kilns (RK) in air or oxygen. The sintering conditions like temperature and time are chosen to achieve a sintered agglomerated compound. They are respectively high and long enough to achieve a primary particle size of 2 to 8 μm. A typical range for the sintering temperature (being the highest dwell temperature in the multiple step sintering process) to achieve such primary particle sizes is between 800 to 1000° C., for a sintering time between 6 and 36 hours. In the invention, the sintered agglomerated compound contains a lithiated transition metal oxide, where the Li/M' molar ratio may be at least 0.5, preferably at least 0.8, and most preferably near to unity.

A sintered agglomerated compound consists of strongly agglomerated particles. It is often "a block" (with a cubic volume of around 3 cm3) which needs to be broken into smaller—still agglomerated—pieces that are smaller than around 5 mm by a crushing tool like a jaw crusher, before further processing. The crushed compounds then consist of strongly agglomerated primary particles having particle sizes below 5 mm, and the single crystals having a particle size of 2 to 8 μm. The primary particles are not just physical agglomerates, but they are also tightly sintered together. The crushed compounds then need to be milled. However, a "normal" dry milling technique such as an air classifying mill is not efficient alone to break the tightly agglomerated particles into their constituent primary particles. Generally, in a long normal dry milling process, fine particles which have a sub-micron size are generated before the large agglomerates are broken into primary particles. A PSD measurement of the resulting powder will show the existence of a tail of fine particles and a tail of extended large particle. The value of the span (=(D90-D10)/D50) obtained by a dry milling process is too high, typically higher than 3. By a classification technology with repeated milling and additional sieving, this span could be reduced but will rarely be less than 1.5. Depending on the proposed milling techniques in this invention, the normal dry milling technique might be necessary in advance to break smaller pieces (that are smaller than around 5 mm) into even more smaller agglomerates (that are smaller than 200 μm) because it could increase the milling thruput.

This invention applies a solvent based milling—which is the key of this invention—on jaw crushed small pieces or dry milled small agglomerates. The far most suitable solvent in this invention is water. The definition of "wet ball milling" in this invention is thus a process to de-agglomerate primary particles by the impact of beads in water. Water is cheap, nonflammable and allows to combine wet milling with other processes. Another key advantage of water is that it catalyzes the de-agglomeration of the sintered agglomerated particles into single primary particles. The grain boundaries in the agglomerated particles contain Li salts like $Li_2CO_3$ or $Li_2SO_4$ which are soluble in water. These salts facilitate a strong contact between the primary particles. In the wet medium like water, the salts can dissolve and loosen the contact between primary particles. Therefore, a milling step under the action of water allows to de-agglomerate the primary particles without creating lots of damage of the primary particles, and without creating an excessive amount of fine particles. It has been found that a dry ball milling is not desirable since a much longer milling time and more milling energy are required. Not only the milling energy but also the quality of milling is a drawback of a dry ball milling. For example, primary particles can be broken due to the high milling energy of a dry ball milling before they are deagglomerated from secondary particles, resulting in more fine fraction.

Figure 2:
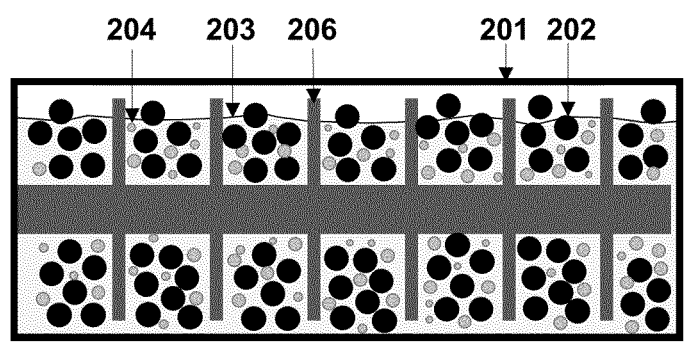
FIG. 2. Schematic image of wet bead milling process. 201—(fixed) chamber, 202—milling medium (balls), 203—solvent, 204—target powder, and 206—rotating agitator.

The wet ball milling in this invention includes a conventional ball milling in a solvent as well as a conventional bead milling in a solvent. A conventional "ball/bead" milling process is the wet milling processes in this invention. Generally, ball milling is used for producing nano-scale mixtures or very fine powders. However, the current invention applies the ball milling process to produce particle size-controlled positive electrode materials. FIG. 1 and FIG. 2 show a schematic image of a conventional ball milling process (with a rotating vessel and no agitator) and a conventional bead milling process (with a rotating agitator in a stationary vessel), respectively. The objective of the wet ball milling is to separate primary particles from secondary particles without creating fine particles. Therefore, a careful choice of milling conditions is implemented.

The milling effectiveness of wet ball milling highly depends on the size of the balls, the milling speed and time. The milling speed can be defined as total rotated length of the vessel per second for a conventional ball milling equipment, or total rotated length of the agitator tips (tip speed) for a horizontal or vertical bead milling equipment. For example, if a vessel which has the circumference of 50 cm is rotated once per second in a ball milling equipment, the milling speed is 50 cm/s. When 10 mm balls are used as a milling media, a longer milling time is required to achieve the desired PSD. When 2 mm balls are used as a milling media, a short milling time is required. The optimal size of balls in this invention is in the range of 0.5 to 10 mm. The milling speed is typically less than 50 cm/s, often as small as 10 cm/s in a conventional ball milling equipment. The milling speed (tip speed) in a bead milling equipment is typically less than 500 cm/s. Although higher milling speeds can achieve the reduction of particle size faster, more fine particles may be created. Therefore, a fine tuning of the milling speed and milling time is required.

The solids content (solid/(solid+solvent)) during milling may be at least 30 wt % and at most 70 wt %. As a milling medium, metal (steel) or $ZrO_2$ balls are most preferred since they are a good compromise of density, cost and abrasion. However, other media, such as $Al_2O_3$ and WC can be used as well.

After the wet ball milling, a slurry of milled single crystalline primary particle is obtained. The PSD can be directly measured from the slurry. The D50 is at least 2 μm and at most 8 μm, which is basically the same as the primary particle size of sintered agglomerated particle after the solid state reaction. The span is low with a typical value of 0.9-1.3. The authors speculate that the combination of ball size and milling speed—together with the densities of water and agglomerated compounds—causes a strong classification effect where relatively small particles follow the solvent which passes by the balls in a slalom or snake-line floor. Because larger particles cannot follow the solvent flow, they have a much higher likelihood to move straight forward and get crashed in between 2 balls, to undergo more milling.

An important parameter of the monolithic positive electrode material is the particle size. The positive electrode material having a small D50 (around 3 μm) has a high power performance in a battery. However, if the D50 is too small, the packaging density and safety deteriorate due to the larger surface area. If the particle size increases the packaging density increases and the safety improves. However, if the D50 exceeds 8 μm, the rate performance deteriorates too much. Therefore, the D50 (primary particle size of the monolithic compounds) is an important design parameter. For automotive batteries operating at ambient temperature, the D50 should be at least 2 μm and at most 8 μm. The optimum particle size might be on the high side for high temperature operating batteries, such as polymer batteries that operate at 60° C.

As described before, the particle size of the monolithic compounds can be controlled by the sintering temperature determining the primary particle size after sintering; and the wet milling conditions. There are three main advantages of the wet milling process for monolithic positive electrode materials: precursor flexibility, control of surface impurity, and possibility of in-situ surface modification.

First, the inventive process allows to use mixed transition metal precursors of a variety of shapes. There is no need for "shaped" precursors meaning that the shape and size of a precursor is resembling the preferred shape and size of the final positive electrode material. Possible mixed transition metal precursors are mixed transition metal hydroxides, carbonates, oxides or oxy-hydroxides. Preferably, the precursors have the transition metal cations well-mixed at atomic scale. However, in some implementations, also mixtures of different transition metal compounds can be utilized. Mixed transition metal precursors can be "normal" precursors like the precipitated mixed transition metal hydroxides (MTH) which are widely utilized. The precursor preparation creates waste. The invention allows to develop a precursor process with focus on low cost and applies this precursor for different monolithic products. Therefore, the inventive process allows also simple logistics (precursor unification) or precursor flexibility (different suppliers—commoditization). Mixed transition metal precursors can be produced by a "clean" process without wastes such as a pyrolysis process. It is very difficult or impossible to design the shape of the obtained oxide in a pyrolysis process, since generally, a pyrolyzed precursor consists of small crystallites which are agglomerated, resulting in a relatively low powder density. Such precursors are not utilized for the production of normal positive electrode materials since a "shaping step" is needed. For example, a desired morphology can be obtained by a separate spray drying step. The current inventive process allows to bypass this spray drying step.

Second, wet ball milling process can reduce the quantity of surface impurities of positive electrode materials. The presence of large quantities of surface impurities like unreacted LiOH or $Li_2CO_3$—also referred to as surface bases—is an issue for the preparation of NMC with higher Ni. The wet ball milling process, when using water as a solvent, efficiently dissolves these impurities until the maximum solubility of LiOH and $Li_2CO_3$ in water is reached. Therefore, the wet milling process can be utilized to remove surface base impurities. For example, if the solid content is 50%, around 1.5 g $Li_2CO_3$ per 100 g positive electrode material (1.5 wt %) can be removed as the solubility of $Li_2CO_3$ in water is 15 g/L. Therefore, the concern of surface impurities which is the most critical point in the process for very high Ni NMC or NCA can be easily addressed.

The surface impurities might be removed by a simple washing process. For example, the powder after a dry milling process is put on a vessel with water (10~50% of powder in weight) and the slurry is stirred by an agitator with high RPM (without the presence of beads). However, this simple washing process is inferior to the wet ball milling process since the stirring in water is never able to separate primary particles from hard agglomerated secondary particles. The wet ball milling is a simple step which is possible not only to separate primary particles with a high quality, but also to remove surface impurity effectively.

A particular impurity may be chlorine (Cl), originating from a pyrolysis process. Since the transition metal chlorides are quite inert, the pyrolyzed transition metal precursor might contain a significant quantity of Cl impurity. The removal of that impurity requires an additional step and might not be feasible. The current process allows to skip the removal step. After the previous firing steps, the Cl impurity is present as highly soluble salt such as LiCl. LiCl can easily dissolve in water during wet milling process. Similarly, the pyrolysis process can be performed using sulfates, and a sulfate impurity such as $Li_2SO_4$ is soluble as well. Therefore, the wet milling process can be utilized to remove impurities like chlorine or sulfate.

Third, the authors discovered that the wet milling allows to achieve an in-situ surface coating during milling without applying a separate process step. Typical examples are coatings by aluminum or cobalt hydroxides. If the positive electrode material has a high Ni content and the Li/M' molar ratio is high, the positive electrode material have an inherent surface base content. In solvents like water, some Li is extracted from the positive electrode material—possibly by ion exchange between Li and protons—resulting in an increase of the solutions pH. The presence of a basic solution can be utilized to precipitate hydroxides onto the surface of positive electrode materials. As an example, if a cobalt salt like $CoSO_4$ is added to the solvent during wet milling process, the sulfate will neutralize the base and $Co(OH)_2$ precipitates. Surprisingly, this precipitation happens at the surface of the particles and the precipitated layer is strong enough to sustain the soft milling that is ongoing. In similar reactions, Al can be added in a salt like $Al_2(SO_4)_3$ or $NaAl(OH)_4$. Even if Al should not precipitate at the high pH in the solvent, it is observed that the surface of positive electrode materials particles are covered with Al. The authors speculate that the surface chemistry of positive electrode materials like NMC enables Al surface precipitation onto the primary particles during milling. Many combinations of in-situ coating and milling are possible.

The throughput of the milling process can be significantly increased by using a milling cascade. In an example of a wet ball milling cascade, in the first milling step relatively big balls (for example, 10 mm or even between 30 and 50 mm balls) and a relatively low milling speed (<20 cm/s) break the small pieces into small agglomerates. This first milling step can alternatively be performed in a dry milling equipment like an ACM (air classifying mill) or AJM (air jet mill). However, neither dry milling nor wet milling with large balls are efficient enough to finish the milling. Especially, when a dry milling technique is applied in the first milling step, the target powder is exposed to a massive amount of air during milling, resulting in the formation of carbonate impurities on the surface of the powder. Therefore, the wet milling continues in a second wet milling process to finish the milling as well as to remove carbonate impurities. This second process may be a wet ball milling process as described before. For example, if the first step is a wet milling process with relatively big balls as described above, in the second process step a typical small ball size ranges from 0.2 to 5 mm, and a typical milling speed is below 500 cm/s. If the speed is higher the primary particles might be damaged.

After the wet ball milling, the solution needs to be separated from the solids. This can be achieved by any suitable separation process like evaporation, filtering or centrifuging. The evaporation is relatively energy intensive and is less suitable if a removal of impurities is desired. Therefore, evaporation is only indicated in special cases, whereas more generally filtering or centrifuging are the desired process steps for separating liquid from solid. The obtained wet solid is usually dried for easy further processing. The liquid contains some minor amount of Li which might be recycled by a suitable recycling process.

The last step of this inventive process is a heat treatment called "healing firing step". During the wet milling process, Li is lost from the solids into the solution. The monolithic positive electrode material possibly contains protons and it is not thermodynamically stable after drying. Therefore, water exposure, especially during the described mechanical milling, results in a poor electrochemical performance. Moreover, as a higher sintering temperature (compared to that of polycrystalline compounds) is applied before milling, this may also be the cause of a poor electrochemical performance. The underlying reason is that a high sintering temperature results in higher cation mixing—Ni being present on Li layers in the crystal structure—or even a less oxidized positive electrode material, by extrusion of $Li_2O$ onto grain boundaries. Therefore, an additional healing firing step is applied to convert the positive electrode material into a thermodynamically more stable compound. The temperature for the healing firing step is higher than 300° C. (or even higher than 500° C.) and lower (by at least 20° C.) than the maximum sintering temperature of the previous sintering step. It can be performed in a suitable furnace such as a RHK or RK in an oxidative atmosphere, and preferably in air or in oxygen if the Ni content is high. If the temperature of the healing firing process is higher than the maximum sintering temperature of the previous sintering step, additional sintering and re-agglomerating of primary particles will happen and the final product loses its monolithic morphology. Additionally, due to the Li loss or by the process design, the Li/M' molar ratio of the milled monolithic positive electrode material might be deviating from the target value, resulting in a Li deficiency (a Li/M' ratio less than the target value). Therefore, additional Li, typically in the form of LiOH or $Li_2O$, is added and the healing firing is performed at a sufficiently high temperature to achieve the full reaction of the Li with the Li deficient positive electrode material.

The selection of a precise temperature in the healing firing step is particularly indicated if the wet milling step was combined with an in-situ coating step or if an ex-situ coating step was applied after wet milling. For example, if the milled NMC had been in-situ coated by Co, either a core-shell (LCO shell on NMC core) product at low temperature, or a uniformly Co-enriched NMC at high temperature are achieved. Similar considerations apply for an Al coating. The Al is doped at high temperature and coated at low temperature, and a gradient is achieved at an intermediate temperature.

After the healing firing step, a high performance monolithic product is achieved. Additional treatments like additional surface coatings or blending with other products can be applied according to the design of the product. It is also possible to apply certain design targets—for example blending with other product—before the healing firing. In this case the healing firing step is applied to a mixture of different products containing a monolithic NMC.

Since there are three heat treatment steps ($1^{st}$ firing, $2^{nd}$ firing, and healing firing) in this inventive process, the Li stoichiometry (Li/M') of the final product can be adjustable in any one of these heat treatment step. For example, low Li/M' (for example 0.8) can be chosen in the $1^{st}$ firing of a high Ni compound to limit the carbonate surface impurity when air is used as an oxygen containing gas. Then, more lithium can be added in the $2^{nd}$ firing to increase the Li/M' (for example to 1.06). In the healing firing, the Li stoichiometry is adjustable by adding a transition metal containing coating agent (for example 5 mol % $COSO_4$).

The following analysis methods are used in the Examples:

SEM Analysis

The morphology of positive electrode materials and precursors is analyzed by a Scanning Electron Microscopy (SEM) technique. The measurement is performed with a JEOL JSM 7100F or scanning electron microscope equipment under a high vacuum environment of $9.6\times10^{-5}$ Pa at 25° C. or with JSM-6000.

PSD Analysis

The PSD is measured using a Malvern Mastersizer 3000 with Hydro MV wet dispersion accessory after dispersing the powder in an aqueous medium. In order to improve the dispersion of the powder, sufficient ultrasonic irradiation and stirring is applied, and an appropriate surfactant is introduced. D10, D50 and D90 are defined as the particle size at 10%, 50% and 90% of the cumulative volume % distribution. The span is defined as (D90-D10)/D50.

Carbon Analysis

The content of carbon in positive electrode materials is measured by a Horiba EMIA-320V Carbon/Sulfur analyzer. 1 g of sample is placed in a ceramic crucible in a high frequency induction furnace. 1.5 g of tungsten and 0.3 g of tin are added as accelerators into the crucible. The sample is heated to a programmable temperature. Gases produced during the combustion are then analyzed by four infrared detectors. The analysis of low and high $CO_2$ and CO determines the carbon concentration.

Chlorine Analysis

A chlorine content is measured by a combustion ion-chromatography method. The equipment is composed of a multi matrix sampler MMS-5000 from Analytik Jena, a combustion module from Analytik Jena, an absorber module 920 from Metrohm, and 811 compact IC pro from Metrohm. A powder sample is weighed in an alumina boat. The boat is put on the MMS-5000 and the analytical sequence is initiated via MagIC Net software. The boat automatically enters the combustion module which is at a temperature of 1100° C. The resulting gases are collected in the absorber module filled with a 0.01% $H_2O_2$ solution. The absorber solution is automatically injected in the ion chromatograph and chromatography takes place using an eluent of 3.2 mM $Na_2CO_3$ and 1 mM $NaHCO_3$. The quantities of anions are calculated by the software.

Coin Cell Testing

For the preparation of a positive electrode, a slurry that contains a positive electrode material, conductor (Super P, Timcal), binder (KF #9305, Kureha)—with a formulation of 90:5:5 by weight—in a solvent (NMP, Mitsubishi) is prepared by a high speed homogenizer. The homogenized slurry is spread on one side of an aluminum foil using a doctor blade coater with a 230 µm gap. The slurry-coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between the positive electrode and a piece of lithium foil used as negative electrode. 1M $LiPF_6$ in EC/DMC (1:2) is used as electrolyte and is dropped between separator and electrodes. Then, the coin cell is completely sealed to prevent leakage of the electrolyte.

The coin cell test in the present invention, which is a conventional "constant cut-off voltage" test, follows the schedule shown in Table 1. Each cell is cycled at 25° C. using a Toscat-3100 computer-controlled galvanostatic cycling station (from Toyo). The coin cell testing procedure uses a 1 C current definition of 160 mA/g and comprises two parts as follows: Part I is the evaluation of rate performance at 0.1 C, 0.2 C, 0.5 C, 1 C, 2 C and 3 C in the 4.3-3.0V/Li metal window range. With the exception of the $1^{st}$ cycle where the initial charge capacity (CQ1) and discharge capacity (DQ1) are measured in constant current mode (CC), all subsequent cycles feature a constant current-constant voltage during the charge, with an end current criterion of 0.05 C. A rest time (between each charge and discharge) of 30 minutes for the first cycle and 10 minutes for all subsequent cycles is allowed.

Part II is the evaluation of cycle life at 1 C. The charge cut-off voltage is set as 4.5V/Li metal. The discharge capacity at 4.5V/Li metal is measured at 0.1 C at cycles 7 and 34 and 1 C at cycles 8 and 35. The capacity fading, QF1C, is calculated as follows:

$$QF1C = \left(1 - \frac{DQ35}{DQ8}\right) \times \frac{10000}{24} \text{ in \%/100 cycles}$$

TABLE 1

Cycling schedule for Coin cell testing

| Type | Cycle No | Charge | | | | Discharge | | | |
|---|---|---|---|---|---|---|---|---|---|
| | | C Rate | End current | Rest (min) | V/Li metal (V) | C Rate | End current | Rest (min) | V/Li metal (V) |
| Part I | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II | 7 | 0.25 | 0.10 C | 10 | 4.5 | 0.10 | — | 10 | 3.0 |
| | 8 | 0.25 | 0.10 C | 10 | 4.5 | 1.00 | — | 10 | 3.0 |
| | 9~33 | 0.50 | 0.10 C | 10 | 4.5 | 1.00 | — | 10 | 3.0 |
| | 34 | 0.25 | 0.10 C | 10 | 4.5 | 0.10 | — | 10 | 3.0 |
| | 35 | 0.25 | 0.10 C | 10 | 4.5 | 1.00 | — | 10 | 3.0 |

Full Cell Testing 200 mAh pouch-type cells are prepared as follows: the positive electrode material, Super-P (Super-P, Timcal), graphite (KS-6, Timcal) as positive electrode conductive agents and polyvinylidene fluoride (PVDF 1710, Kureha) as a positive electrode binder are added to N-methyl-2-pyrrolidone (NMP) as a dispersion medium so that the mass ratio of the active material powders, the positive electrode conductive agents Super-P and graphite resp., and the binder is set at 92/3/1/4. Thereafter, the mixture is kneaded to prepare a positive electrode mixture slurry. The resulting positive electrode mixture slurry is then applied onto both sides of a positive electrode current collector, made of a 15 µm thick aluminum foil. The width of the applied area is 26 mm and the length is 190 mm. Typical loading weight of a positive electrode active material is about 11±1 mg/cm². The electrode is then dried and calendared using a pressure of 120 Kgf (11.77 N·m). In addition, an aluminum plate serving as a positive electrode current collector tab is arc-welded to an end portion of the positive electrode. Commercially available negative electrodes are used. In short, a mixture of graphite, carboxy-methyl-cellulose-sodium (CMC) and styrenebutadiene-rubber (SBR) in a mass ratio of 96/2/2, is applied on both sides of a copper foil. A nickel plate serving as a negative electrode current collector tab is arc-welded to an end portion of the negative electrode. Typical loading weight of a negative electrode active material is about 9±1 mg/cm². Non-aqueous electrolyte is obtained by dissolving lithium hexafluorophosphate ($LiPF_6$) salt at a concentration of 1.2 mol/L in a mixed solvent of ethylene carbonate (EC), dimethyl carbonate (DMC), and ethyl methyl carbonate (EMC) in a volume ratio of 1:1:1. It contains 0.5% lithium bis(oxalate)borate (LiBOB), 0.5% 1,3-propane sultone (PRS), and 1.0% lithium difluorophosphate ($LiPO_2F_2$) in weight as additives.

A sheet of the positive electrode, a sheet of the negative electrode and a sheet of the microporous polymer separator (22 µm) interposed between them are spirally wound using a winding core rod in order to obtain a spirally-wound electrode assembly. The assembly and the electrolyte are then put in an aluminum laminated pouch in an air-dry room with dew point of −50° C., so that a flat pouch-type lithium secondary battery is prepared. The design capacity of the secondary battery is 200 mAh when charged to 4.20V. The full cell testing procedure uses a 1 C current definition of 200 mA/g.

Pre-Charging and Formation

The non-aqueous electrolyte solution is impregnated into the prepared dry battery for 8 hours at room temperature. The battery is pre-charged with the current of 0.25 C until 15% of its theoretical capacity and aged for a day at room temperature. The battery is then degassed, and the aluminum pouch is sealed. The battery is charged with a current of 0.25 C in CC mode (constant current) up to 4.2V or 4.3V and CV mode (constant voltage) until a cut-off current of C/120 is reached. The battery is discharged with a current of 0.50 C in CC mode down to 2.7V. Then, it is fully charged with a current of 0.50 C in CC mode up to 4.2V or 4.3V and CV mode until a cut-off current of C/20 is reached. The charged battery is aged for a week. The aged battery is ready for the final charging step and the cycling step.

Final Charging

The aged battery, after pre-charging and formation step, is discharged with a current of 0.50 C in CC mode down to 2.7V. It is again charged with a current of 1.0 C in CC mode up to 4.2V or 4.3V and CV mode until a cut-off current of C/20 is reached. Then, the battery is discharged with a current of 0.2 C in CC mode down to 2.7V. The discharge capacity obtained in this discharging step is defined as the specific capacity (SQ) of the battery. The battery is charged with a current of 1.0 C in CC mode up to 4.2V or 4.3V. The final charging step is done in 25° C. or 45° C.

Full Cell Cycling

The aged battery, after the pre-charging and formation step, is charged and discharged several times under the following conditions at 25° C. or 45° C., to determine the charge-discharge cycle performance:

charging is performed in CC mode with 1 C up to 4.2V or 4.3V and CV mode until C/20 is reached,
the cell is set to rest for 10 minutes,
discharging is done in CC mode with 1 C down to 2.7V,
the cell is set to rest for 10 minutes,
the charging-discharging cycles proceed until the battery reaches around 80% retained capacity. Every 100 cycles, one discharge is done with the current of 0.2 C in CC mode down to 2.7V. QF1000 is the relative discharge capacity after 1000 cycles compared to the initial discharge capacity (Full cell discharge capacity at $1000^{th}$ cycle/full cell discharge capacity at $1^{st}$ cycle).

ICP Analysis

The Ni, Mn, and Co (and dopant) contents are measured with the Inductively Coupled Plasma (ICP) method by using an Agillent ICP 720-ES. 2 g of precursor powder sample is dissolved into 10 mL high purity hydrochloric acid in an Erlenmeyer flask. The flask could be covered by glass and heated on a hot plate for complete dissolution of the precursor. After being cooled to the room temperature, the solution is moved to a 100 mL volumetric flask with 3-4 times of rinsing the flask using distilled (DI) water. Afterwards, the volumetric flask is filled with DI water up to the 100 mL mark, followed by complete homogenization. 5 mL solution is taken out by a 5 mL Pipette and transferred into a 50 mL volumetric flask for a 2nd dilution, where the volumetric flask is filled with 10% hydrochloric acid up to the 50 mL mark and then homogenized. Finally, this 50 mL solution is used for ICP measurement.

The invention will be further described by the following examples:

Example 1 and Comparative Example 1

This example illustrates the manufacturing processes to produce the high Ni monolithic NMC in detail, and the characteristics of the products after each process step—the intermediate products being considered comparative examples. A monolithic high Ni NMC, labelled EX1-C1 and having the target formula $Li(Ni_{0.60}Mn_{0.17}Co_{0.23})O_2$ is obtained through a sintering process (process A), a milling process (process B) and a healing firing (process C) running as follows:

Process A. Preparation of Agglomerated Intermediate High Ni NMC

This double sintering process is disclosed in patent application WO2018/158078A1: a solid state reaction between a Li source and a mixed transition metal precursor (referred to as MTH hereafter).

A1) Co-precipitation: a MTH having a composition of $Ni_{0.625}Mn_{0.175}Co_{0.200}O_{0.43}(OH)_{1.57}$ is prepared by the process described in KR101547972B1. The MTH has the D50 of around 4 μm and is labelled pEX1.

A2) $1^{st}$ blending: to obtain a lithium deficient sintered precursor, $LiOH \cdot H_2O$ and the MTH are homogenously blended with a Li/M' ratio of 0.90 in a Henschel mixer for 30 minutes.

A3) $1^{st}$ sintering: the blend from the $1^{st}$ blending step is sintered at 700° C. for 10 hours under $O_2$ atmosphere in a chamber furnace. The product obtained from this step is a powderous lithium deficient sintered precursor with Li/M'=0.90.

A4) $2^{nd}$ blending: the lithium deficient sintered precursor is blended with $LiOH \cdot H_2O$ in order to correct the Li stoichiometry to Li/M'=1.01. The blending is performed in a Henschel mixer for 30 minutes.

A5) $2^{nd}$ sintering: the blend from the $2^{nd}$ blending is sintered at 930° C. for 12 hours in an oxygen containing atmosphere in a chamber furnace. The sintered blocks are crushed by a jaw crushing equipment and named CEX1-A.

Process B. Preparation of High Ni NMC with Monolithic Morphology

B1) $1^{st}$ milling: the crushed large agglomerated compound (A5)) is milled by an air classifying milling equipment to prepare the agglomerated intermediate high Ni NMC. The agglomerated intermediate high Ni NMC is labelled CEX1-B1.

B2) $2^{nd}$ milling—wet ball milling: To separate the obtained agglomerated intermediate particles into monolithic primary particles, a wet ball milling process is applied, as shown in FIG. 1. 1 kg of the agglomerated intermediate high Ni NMC is put in a 5 L vessel (diameter=16.5 cm) with 1 L deionized water and 10 mm $ZrO_2$ balls with a filling ratio of 25% of the volume of the vessel. The vessel is rotated on a commercial ball mill equipment which has rollers having a diameter of 6 cm at 50 RPM for 15 hours. The calculated milling speed is around 16 cm/s.

B3) Filtering and drying: the wet milled solid powder is separated from water by using a Buchner filter. The filtered wet milled compound is dried at 80° C. in a conventional oven with dry air. The dried monolithic high Ni NMC is labelled CEX1-B2.

Process C. Preparation of Healed Final Monolithic High Ni NMC

C1) $3^{rd}$ blending: the compound from B3) is blended with 5.5 mol % of $LiOH \cdot H_2O$ (vs. M' in the compound from B2)

to compensate for Li losses during the wet-milling, and 5.0 mol % of nano cobalt nitrate (vs. M' in the compound from B2). The blending is performed in a blending equipment called Eirich mixer for 1 minute.

C2) Healing firing ($3^{rd}$ sintering): the blend from C1) is heated at 750° C. for 10 hours under oxygen containing atmosphere in a chamber furnace. The sintered compound is sieved. The final high Ni monolithic NMC is labelled EX1-C1.

A high Ni monolithic NMC, EX1-C2, having the target formula $Li(Ni_{0.60}Mn_{0.17}Co_{0.23})O_2$ is obtained by the same preparation method as EX1-C1, except that the $2^{nd}$ firing temperature in step A5) is 950° C. instead of 930° C.

TABLE 2

Physical and electrochemical property of Example 1 and Comparative Example 1

| Sample ID | PSD D50 (μm) | span | Carbon (ppm) | Coin cell DQ1 (mAh/g) | QF1C (%) | Full cell 4.2 V, 25° C. SQ mAh/g | QF1000 % |
|---|---|---|---|---|---|---|---|
| pEX1 | 3.9 | 0.8 | | | | | |
| CEX1-B1 | 5.8 | 2.2 | 271 | 175.7 | 17.0 | 167.9 | 92 |
| CEX1-B2 | 3.5 | 1.2 | 180 | 175.3 | 25.4 | | |
| EX1-C1 | 4.8 | 1.2 | 192 | 178.6 | 15.4 | 172.3 | 95 |
| EX1-C2 | 6.0 | 1.0 | | 175.0 | 7.9 | | |

Figure 3:
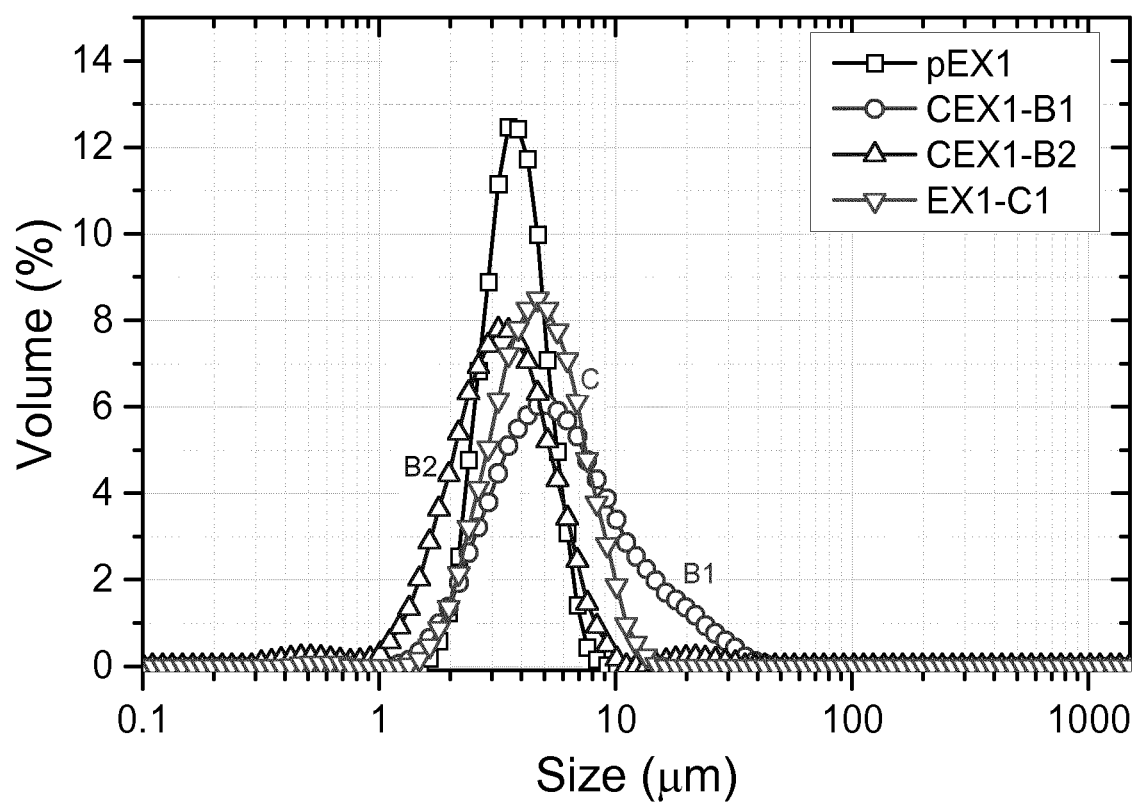
FIG. 3. PSD curve of Example 1 and Comparative Example 1, x axis: particle size (μm), y axis: volume %.
Figure 4:
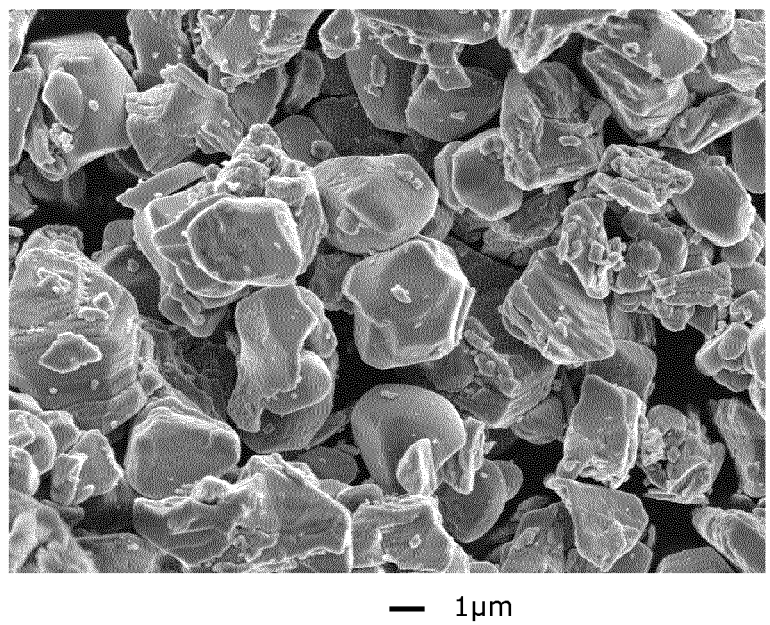
FIG. 4. SEM image of EX1-C1, magnification ×5000.

Table 2 shows the physical and electrochemical property of Example 1 and Comparative Example 1. The detail PSD is shown in FIG. 3. It is observed that CEX1-B1 (the product after first dry milling) has a much broader span than the starting MTH (pEX1), indicating that dry milling cannot properly break the agglomerated particles. Especially, CEX1-B1 has lots of big agglomerated particles (right tale in PSD curve), which can potentially decrease the capacity in a battery. CEX1-B2 (the product after wet milling) has a lower span as well as smaller D50 than CEX1-B1, with the proper monolithic morphology. However, the electrochemical property such as capacity (DQ1) and cycle stability (QF1C) of CEX1-B2 is worse than CEX1-B1. It is assumed that the wet milling process induces a physical stress on the particles and some Li is extracted by the water through ion exchange. EX1-C1 (after healing firing with Li and Co) has a slightly higher D50 than CEX1-B2, indicating that the healing firing with Li and Co can increase the particle size. FIG. 4 shows a FE-SEM image of EX1-C1. It is clear that EX1-C1 comprises monolithic particles. Since it still has the proper span without fine particles (pulverized primary particles) and without big agglomerated particles, it can be considered as have the desired monolithic morphology. The electrochemical properties of EX1-C1 are much better than those of CEX1-B1 in terms of capacity and cycle life. The carbon impurity in high Ni NMC is present in a $Li_2CO_3$ form on the surface of the particles and is one of the most annoying impurities. The carbon impurity of EX1-C1 (after healing firing with Li and Co) is much lower than that of CEX1-B1 (after first dry milling), meaning that the surface base impurity ($Li_2CO_3$) is washed away during the wet milling process.

The PSD of monolithic NMC compounds can be controlled by the process conditions in Process A. The best wet milling condition is the condition that breaks the agglomerated particles into the primary crystallites (particles) without pulverizing the primary particles. Therefore, the primary particles grown during Process A determine the D50 of the monolithic NMC. The D50 of EX1-C2 is larger than that of EX1-C1 because the $2^{nd}$ sintering temperature of EX1-C2 during step A5) is higher than that of EX1-C1. Therefore, it is proven that the D50 of the monolithic NMC can be easily controlled by modifying the sintering conditions without amending the initial properties of the mixed transition metal precursor (pEX1) such as the D50 of the MTH. This is a big advantage in terms of logistics because many final products need to have different D50's for different applications, but they can be produced starting from only one (unified) precursor.

Example 2 and Comparative Example 2

This example illustrates the manufacturing processes to produce a very high Ni monolithic NMC, and the characteristics of the products after each process step—the intermediate products being considered comparative examples. A very high Ni monolithic NMC, EX2-C1, having as target formula $Li_{0.97}(Ni_{0.86}Co_{0.14})_{1.03}O_2$ is obtained through a double sintering process (process A), a milling process (process B) and a healing firing (process C) running as follows:

Process A. Preparation of Agglomerated Intermediate Very High Ni NMC

A1) Co-precipitation: a MTH having a composition of $Ni_{0.90}Co_{0.10}O_{0.15}(OH)_{1.85}$ is prepared by the process described in KR101547972B1. The MTH has a D50 of 4.4 μm and is labelled pEX2.

A2) $1^{st}$ blending: to obtain a lithium deficient sintered precursor, $LiOH \cdot H_2O$ and the MTH are homogenously blended with a Li/M' ratio of 0.90 in a Henschel mixer for 30 minutes.

A3) $1^{st}$ sintering: the blend from the $1^{st}$ blending step is sintered at 700° C. for 10 hours under $O_2$ atmosphere in a pilot RHK furnace. The product obtained from this step is a powderous lithium deficient sintered precursor with Li/M'=0.90.

A4) $2^{nd}$ blending: the lithium deficient sintered precursor is blended with LiOH in order to correct the Li stoichiometry to Li/M'=0.95. The blending is performed in a Henschel mixer for 30 minutes.

A5) $2^{nd}$ sintering: the blend from the $2^{nd}$ blending is sintered at 830° C. for 10 hours under $O_2$ atmosphere in a pilot RHK furnace. The sintered blocks are crushed by a jaw crushing equipment.

Process B. Preparation of Very High Ni NMC with Monolithic Morphology

B1) $1^{st}$ milling: the crushed large agglomerated compound is milled by an air classifying milling equipment to prepare the agglomerated intermediate very high Ni NMC. The agglomerated intermediate very high Ni NMC is labelled CEX2-B1.

B2) $2^{nd}$ milling (wet ball milling): CEX2-B2 is prepared by the same process as Process B of CEX1-B2 using CEX2-B1 as the agglomerated intermediate very high Ni NMC except that the drying in step B3) is done in a $N_2$ atmosphere.

Process C. Preparation of Healed Final Very High Ni Monolithic NMC

EX2-C1 is prepared by the same process as Process C of EX1-C1 using CEX2-B2 as the dried very high Ni monolithic NMC, expect that the healing firing in C2) is done at 700° C. under $O_2$ atmosphere.

EX2-C2 having the formula of $Li_{0.97}(Ni_{0.90}Co_{0.10})_{1.03}O_2$ is prepared by same process like EX2-C1 except that the nano cobalt nitrate powder is not added, but only 0.5 mol % LiOH is added in step C1).

TABLE 3

Physical and electrochemical property of Example 2 and Comparative Example 2

| Sample ID | PSD | | Carbon (ppm) | Coin cell | |
|---|---|---|---|---|---|
| | D50 (μm) | span | | DQ1 (mAh/g) | QF1C (%) |
| pEX2 | 4.4 | 0.8 | | | |
| CEX2-B1 | 4.9 | 2.6 | 484 | 194.1 | 19.6 |
| CEX2-B2 | 2.9 | 1.2 | 348 | 195.9 | 18.2 |
| EX2-C1 | 3.2 | 1.1 | 185 | 200.7 | 10.3 |
| EX2-C2 | 4.0 | 1.1 | 195 | 195.7 | 8.2 |

Figure 5:
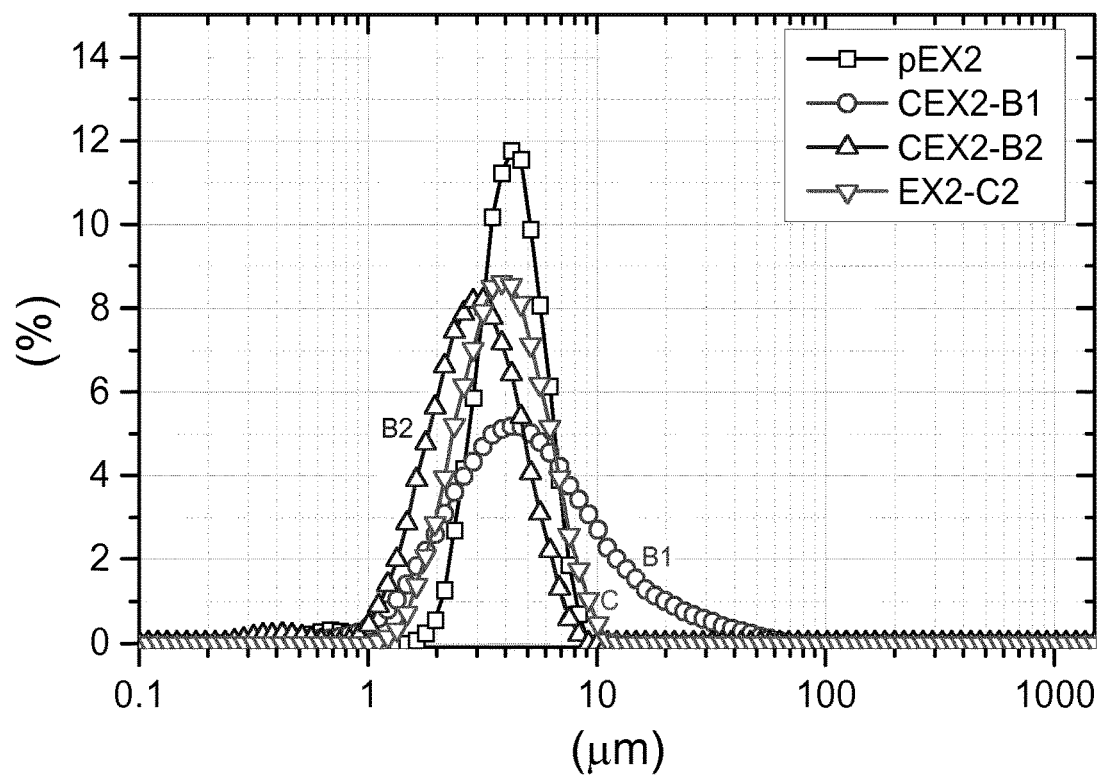
FIG. 5. PSD curve of Example 2 and Comparative Example 2, x axis: particle size (μm), y axis: volume %.

Table 3 shows the physical and electrochemical properties of Example 2 and Comparative Example 2. The detail PSD is shown in FIG. 5. The exact same conclusion like the high Ni monolithic NMC (Example 1) can be drawn for the very high Ni monolithic NMC (Example 2) in terms of PSD, carbon (surface base) content, and electrochemical properties. Especially the carbon content of EX2-C2 is outstanding considering its high Ni content. EX2-C2 has a better cycle stability and slightly higher capacity than CEX2-B1, indicating that the Co addition during healing firing is optional. In fact, the Co additive increases the capacity significantly whilst marginally sacrificing cycling stability.

Comparative Example 3

This example illustrates the advantage of the very high Ni monolithic NMC from the inventive process, compared to a conventional very high Ni polycrystalline NMC compound.

A very high Ni polycrystalline NMC, labelled CEX3, has the target formula $Li(Ni_{0.90}Co_{0.10})O_2$, and is obtained through a single sintering process which is a direct solid state reaction between a Li source and a MTH running as follows:

1) Co-precipitation: a MTH having a composition of $Ni_{0.90}Co_{0.1000.12}(OH)_{1.83}$ is prepared by the process described in KR101547972B1. The MTH has the D50 of around 15 μm. The MTH is labelled pCEX3.

2) Blending: LiOH and the MTH are homogenously blended with a Li/M' ratio of 1.0 in a Henschel mixer for 30 minutes.

3) Sintering: the blend from the blending step is sintered at 740° C. for 10 hours under $O_2$ atmosphere in a pilot RHK furnace.

4) Dry milling: the sintered powder from step 3) is milled by an air classified milling equipment to prepare the very high Ni polycrystalline NMC. The very high Ni polycrystalline NMC is labelled CEX3.

Figure 6:
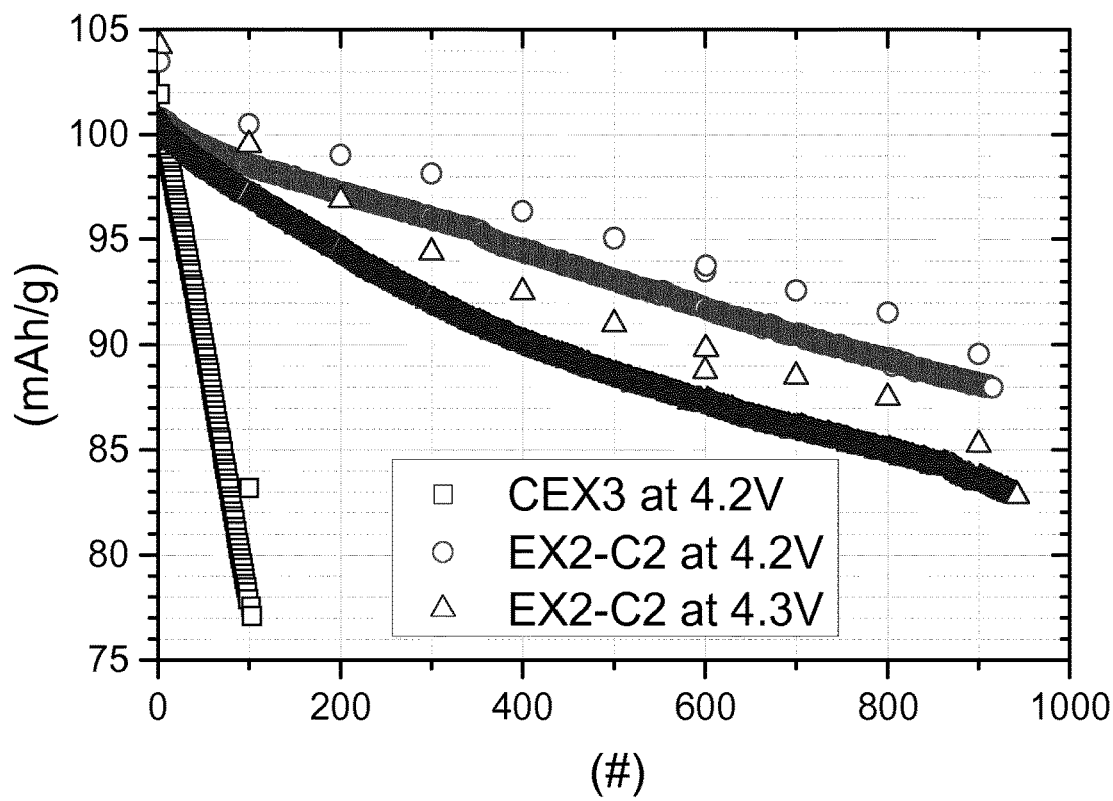
FIG. 6. Capacity as a function of full cell cycle number in CEX3 at 4.2V, EX2-C2 at 4.2V, and EX2-C2 at 4.3V with a cycling temperature of 45° C.
Figure 7:
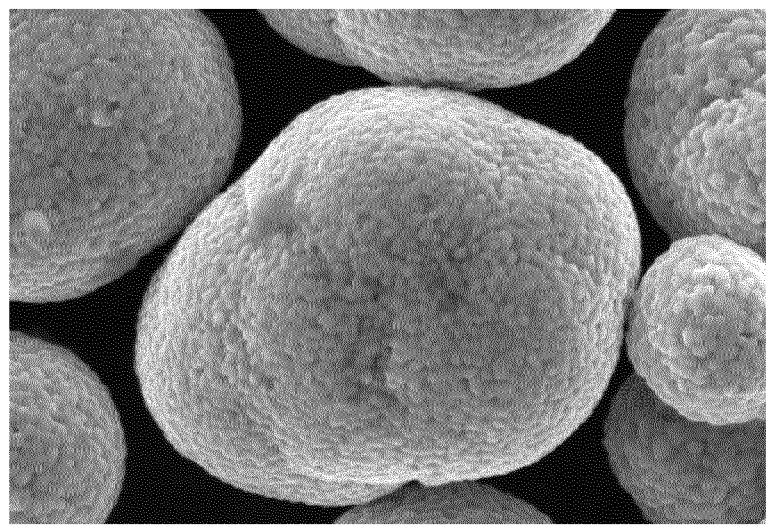
FIG. 7. SEM image of (a) CEX3 and (b) EX2-C2, magnification ×5000.
Figure 7:
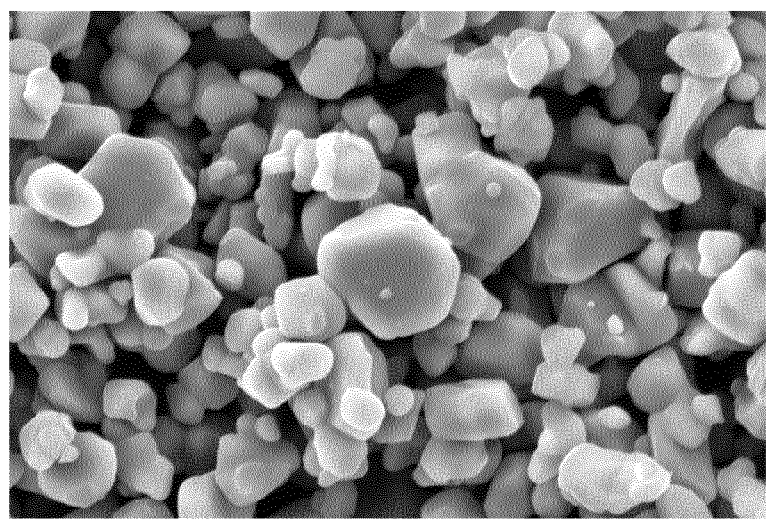

Full cell testing of CEX3 and EX2-C2 is performed at 45° C. with the cycling voltage range of 4.2V-2.7V or 4.3V-2.7V. The specific capacity (SQ) of CEX3 at 4.2V is 185.6 mAh/g while that of EX2-C2 is 183.9 mAh/g, meaning that the very high Ni polycrystalline NMC has a slightly higher capacity than the very high Ni monolithic NMC. However, the cycle stability of EX2-C2 is significantly better than that of CEX3 as shown in FIG. 6. FIG. 7 (a) and (b) shows the SEM image of CEX3 and EX2-C2. CEX3 can be considered as a general commercial very high Ni polycrystalline NMC. Generally, the cycling stability of a product which has a big particle size tends to be better than that of a product which has a smaller particle size. Therefore, the cycle stability of EX2-C2, which has a smaller D50 than CEX3, is surprisingly excellent. An even more surprising observation is that the cycle stability of EX2-C2 at a higher voltage—such as 4.3V—is also very good compared to that of CEX3 at a normal voltage of 4.2V. Therefore, it is proven that the very high Ni monolithic NMC has a superior cycling stability in a battery at a normal and high voltage, compared to very high Ni polycrystalline NMC compounds.

Example 3

This example illustrates that the process has the advantage of a flexible choice of precursor particle sizes. Monolithic NMC compounds, EX3-C1~C3, having the target formula $Li(Ni_{0.52}Mn_{0.19}Co_{0.24})O_2$ are obtained through the same process of EX1-C1 except that:

1) pEX3 (see below) is used as a MTH in step A2),
2) $LiOH \cdot H_2O$ is added to correct the Li stoichiometry to Li/M'=1.06 in step A4),
3) the $2^{nd}$ sintering temperatures described in the Table 4 are used in step A5) and
4) 5.0 mol % Mn doped nano Co oxide (3 mol % Mn vs. Co) is added instead of nano Co nitrate and $LiOH \cdot H_2O$ in step C1).

pEX3, having a composition $Ni_{0.60}Mn_{0.20}Co_{0.20}O_{0.17}(OH)_{1.83}$, is prepared by a co-precipitation process in a mass production line using a continuous stirred tank reactor (CSTR). A feed of 2M metal sulfate ($M'SO_4$ wherein $M'=Ni_{0.60}Mn_{0.20}Co_{0.20}$) and a feed of 10M NaOH are supplied to the reactor. Additionally, a flow of 15M $NH_4OH$ is added as complexing agent. The residence time—being the reactor volume divided by the total flow rate—is 3 hours, and the temperature is set at 60° C. A protective atmosphere of $N_2$ is recommended to keep the level of impurities low. The overflowing slurry containing the precipitate is collected. The collected slurry is filtered and washed with deionized water. The washed wet compound is dried as 150° C. for 24 hours under $N_2$ atmosphere. The obtained precursor is labelled pEX3, has a D50 of 11.8 μm and a spherical (shaped) morphology.

TABLE 4

The $2^{nd}$ sintering temperature and PSD of Example 3

| Sample ID | 2nd sintering T ° C. | PSD | |
|---|---|---|---|
| | | D50 μm | span |
| pEX3 | | 11.8 | 1.3 |
| EX3-C1 | 900 | 3.3 | 1.5 |
| EX3-C2 | 920 | 5.0 | 1.2 |
| EX3-C3 | 940 | 6.5 | 1.2 |

Figure 8:
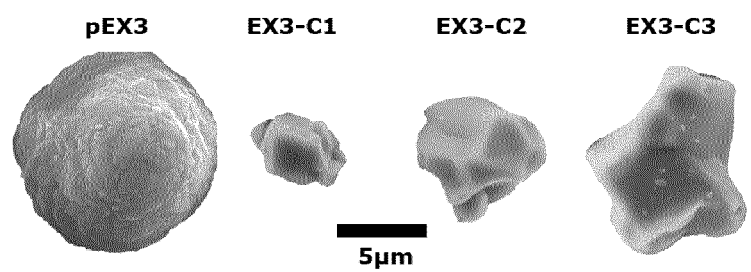
FIG. 8. SEM image of particles of pEX3, EX3-C1, EX3-C2, and EX3-C3.

Table 4 shows the $2^{nd}$ sintering temperature and PSD of Example 3. FIG. 8 shows the morphology of pEX3, EX3-C1, EX3-C2, and EX3-C3. The core of this example is that the MTH pEX3 has a D50 of around 12 μm, which is much bigger than the recommended D50 range of monolithic NMC (2 μm-8 μm). The D50 of EX3-C1, EX3-C2 and EX3-C3 indicates that the particle size of monolithic NMC compounds can be controlled by the sintering temperature regardless of the particle size of the MTH. Again, this is a big advantage in terms of logistics as explained in Example 1. Additionally, an MTH with large particle size such as a D50 range of 10 to 13 μm is relatively easy to prepare through a co-precipitation process, compared to a small particle size such as a D50 in the 2-5 μm range, because it does not pose a filtering issue. Also, the density of the MTH having a large particle size is higher than the one having a small particle size. This is directly linked to the thruput in the sintering process (process A), because the density of the blend determines the thruput of the product in a conventional RHK or RK sintering process.

Example 4 and Comparative Example 4

Figure 9:
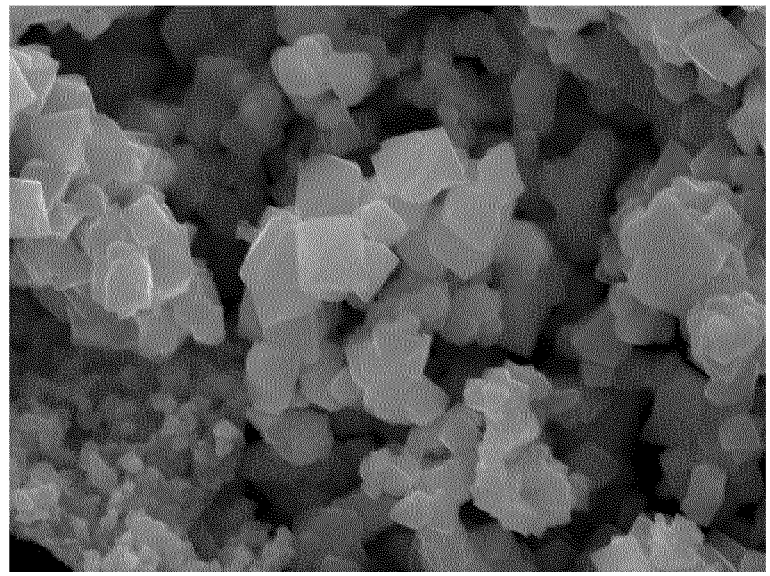
FIG. 9 (a) and (b). SEM image of pEX4, with magnification ×20000 (a) and x2000 (b).
Figure 9:
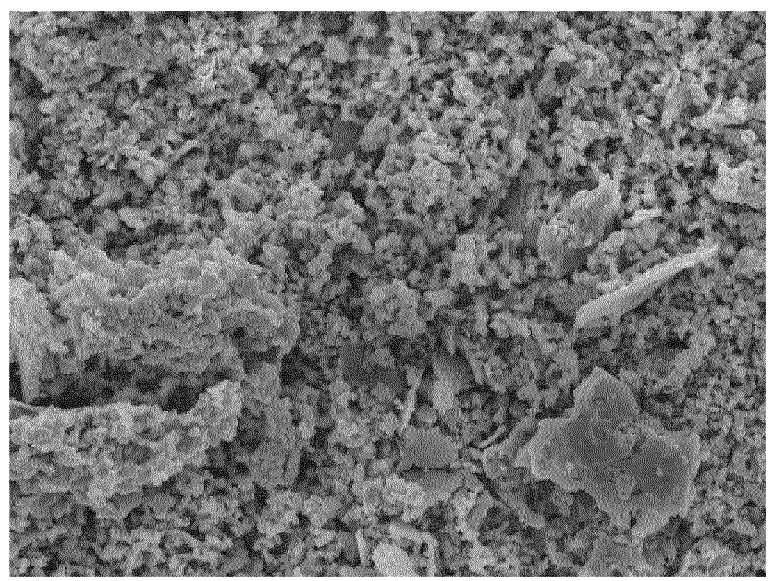

This example shows that monolithic NMC can be prepared using a non-shaped precursor produced by a simple preparation method such as a pyrolysis process. A high Ni monolithic NMC, labelled EX4-C has the target formula Li(Ni$_{0.58}$Mn$_{0.18}$Co$_{0.24}$)O$_2$ and is obtained through the same process as EX1-C1 except that:

1) pEX4 (see below) is used as a mixed transition metal precursor in step A2),
2) LiOH·H$_2$O is added to correct the Li stoichiometry (Li/M'=1.06) in step A4), resulting in "CEX4-B1" after ACM milling and
3) 5.0 mol % Mn doped nano Co oxide (3 mol % Mn vs. Co) is added instead of nano Co nitrate and LiOH·H$_2$O in step C1).

pEX4, having a composition of Ni$_{0.60}$Mn$_{0.20}$Co$_{0.20}$Cl$_{0.02}$O$_{1.15}$, is prepared by a spray pyrolysis process. A solution of mixed metal chloride is sprayed into the pyrolysis reactor which is heated by a natural gas powered flame (mostly methane). The metal composition of the mixed metal solution is Ni$_{0.60}$Mn$_{0.20}$Co$_{0.20}$. The effective residence time is a few seconds and is increased by a suitable reactor design which circulates the hot gas within the reactor. In the gas phase, the reaction M'Cl$_2$+H$_2$O+x/2O$_2$→M'O$_{1+x}$+2HCl occurs at around 900° C., and the solid M'O$_{1+x}$ precipitates. Generally, Some M'Cl$_2$ remains in the solid phase since the reaction is not fully finished. At the exit of the reactor, the solid M'O$_{1+x}$ is separated from the HCl gas, followed by a washing and drying step to remove some of the unreacted M'Cl2. However, some Cl still remains in the final obtained oxide in spite of the washing process. The obtained precursor is labelled pEX4, and consists of around 51% of M'O and 49% of M'$_3$O$_4$ structure with a high Cl impurity (around 0.8 wt %). FIG. 9 (a) and (b) show the morphology of pEX4. It is a fluffy type non-shaped precursor with very small primary particles (below 300 nm). CEX4-B2 is prepared by the same process as CEX1-B2 except that CEX4-B1 is used as agglomerated intermediate particles.

TABLE 5

The 2$^{nd}$ sintering temperature, Cl content and PSD of Example 4

| Sample ID | PSD D50 μm | span | Cl % |
|---|---|---|---|
| pEX4 | | | 0.8 |
| CEX4-B1 | 10.4 | 18.7 | |
| CEX4-B2 | 4.7 | 1.1 | <0.01 |
| EX4-C | 4.9 | 1.1 | |

Figure 10:
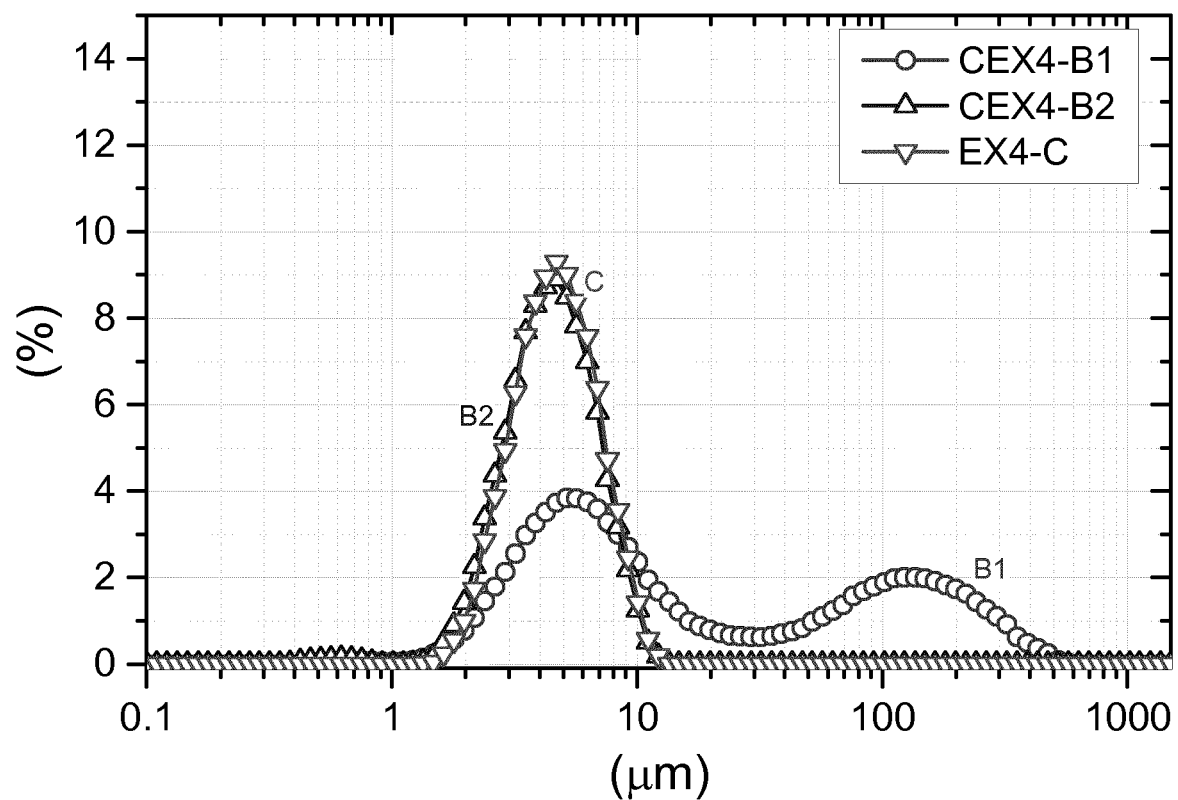
FIG. 10. PSD curve of Example 4 and Comparative Example 4, x axis: particle size (μm), y axis: volume %.

Table 5 and FIG. 10 show the PSD of Example 4 and Comparative Example 4. As shown in FIG. 9 (a) and (b), pEX4 consists of very fine particles and agglomerated fine particles. CEX4-B1 (after 1$^{st}$ dry milling) has a very broad span as well as a large D50, meaning that the primary particles are inhomogeneously strongly agglomerated. The wet milling breaks the agglomerated particles into primary particles effectively also in this case, and the desirable PSD of the monolithic NMC (CEX4-B2) is achieved. The healing firing does not affect the PSD a lot (EX4-C). Therefore, it is proven that the monolithic morphology can be easily achieved by the invention even though a non-shaped nano precursor is used as precursor. The additional advantage of the wet milling process is that any impurities which are soluble in the solvent can be removed during the process. The Cl impurity from the pyrolysis process using Cl can also be removed during the wet process without extra steps needed for dealing with the Cl impurity. In this example, the Cl content after the wet milling step (CEX4-B2) is very low in spite of the very high Cl content in the metal precursor. The Cl content does not change anymore during the healing firing step.

Process Example 1

This example illustrates that the target PSD of the wet ball milled compounds can be achieved by different milling conditions such as ball size, milling speed, and milling time.

A monolithic high Ni NMC compound having the target formula Li (Ni$_{0.625}$Mn$_{0.175}$Co$_{0.200}$) O$_2$ is obtained through a double sintering process (process A), as discussed in patent application WO2018/158078A1, and a wet milling process (process B) running as follows:

Process A. Preparation of agglomerated intermediate high Ni NMC

A1) Co-precipitation: an MTH having a composition of Ni$_{0.625}$Mn$_{0.175}$Co$_{0.200}$O$_{0.43}$(OH)$_{1.57}$ is prepared by the process described in KR101547972B1. The MTH has a D50 of around 4 μm and is labelled pEX1.

A2) 1$^{st}$ blending: to obtain a lithium deficient sintered precursor, Li$_2$CO$_3$ and the MTH are homogenously blended with a Li/M' ratio of 0.85 in a Henschel mixer for 30 minutes.

A3) 1$^{st}$ sintering: the blend is sintered at 935° C. for 10 hours under an oxygen containing atmosphere in a RHK. The product obtained from this step is a powderous lithium deficient sintered precursor with Li/M'=0.85.

A4) blending: the lithium deficient sintered precursor is blended with LiOH·H$_2$O in order to correct the Li stoichiometry to Li/M'=1.01. The blending is performed in a Henschel mixer for 30 minutes.

A5) 2$^{nd}$ sintering: the 2$^{nd}$ blend is sintered at 890° C. for 10 hours in an oxygen containing atmosphere in a RHK. The sintered blocks are crushed by a jaw crushing equipment. The jaw crushed large agglomerated compound is labelled PEX1-A.

Process B. Preparation of High Ni NMC with Monolithic Morphology

B1) Wet ball milling: To break the agglomerated intermediate particles from A5) into monolithic primary particles, a wet ball milling process is applied, as shown in FIG. 1. Four 250 ml bottles (diameter=6 cm) are filled with 50 ml deionized water, ZrO$_2$ balls and 50 g of PEX1-A with a filling ratio of 25% of the volume of the bottles. The bottles are rotated on a commercial ball mill equipment which has rollers with 6 cm diameter. Table 6 shows the milling speed, ball size and milling time of the obtained wet ball milled samples PEX1-B1, PEX1-B2, PEX1-B3, and PEX1-B4.

TABLE 6

The wet ball milling conditions and PSD of Process Example 1

| Sample ID | Ball Size (mm) | Milling speed (cm/s) | Milling time (hour) | PSD D50 (μm) | span |
|---|---|---|---|---|---|
| PEX1-B1 | 10 | 16 | 15.0 | 4.0 | 1.0 |
| PEX1-B2 | 2 | 16 | 5.5 | 4.0 | 1.0 |
| PEX1-B3 | 10 | 47 | 5.0 | 4.1 | 1.1 |
| PEX1-B4 | 2 | 47 | 1.5 | 4.0 | 1.0 |

Table 6 shows the milling conditions and the PSD of the milled compounds. All milled samples have a very similar PSD in spite of the different milling conditions. It is observed that the milling time to achieve a target PSD can be reduced when the ball size is smaller and the milling speed is higher.

Process Example 2

This example illustrates that water is a preferable solvent for a wet milling process and the wet ball milling is superior to an ultrasound treatment. A monolithic high Ni NMC compound with target formula Li(Ni$_{0.6}$Mn$_{0.2}$Co$_{0.2}$)O$_2$ is obtained through a double sintering process (process A) and a wet ball milling process (process B) run:

Process A. Preparation of agglomerated intermediate high Ni NMC

A2) 1$^{st}$ blending: to obtain a lithium deficient sintered precursor, Li$_2$CO$_3$ and pEX3 are homogenously blended with a Li/M' ratio of 0.70 in an industrial Lödige mixer.

A3) 1$^{st}$ sintering: the blend is sintered at 760° C. with a residence time of 62 minutes in an oxygen containing atmosphere in a RK. The product obtained from this step is a powderous lithium deficient sintered precursor with Li/M'=0.70.

A4) 2$^{nd}$ blending: the lithium deficient sintered precursor is blended with LiOH·H$_2$O in order to correct the Li stoichiometry to Li/M'=1.01. The blending is performed in an industrial Lödige mixer.

A5) 2$^{nd}$ sintering: the 2$^{nd}$ blend is sintered at 900° C. for 10 hours in an oxygen containing atmosphere in a chamber furnace. The sintered blocks are crushed by a jaw crushing equipment, obtaining a large agglomerated compound that is labelled PEX2-A.

Process B. Preparation of High Ni NMC with Monolithic Morphology

B1) Wet ball milling: to break the agglomerated intermediate particles (PEX2-A) into monolithic primary particles, a wet ball milling process is applied. Four 250 ml bottles (diameter=6 cm) are filled with 50 ml deionized water, ZrO$_2$ balls and 50 g of PEX1-A with a filling ratio of 25% of the volume of the bottles. The bottles are rotated on a commercial ball mill equipment which has rollers with 6 cm diameter. Table 7 shows the solvent nature and the milling time for obtaining PEX2-B1, PEX2-B2, CPEX2-B1, and CPEX2-B2.

TABLE 7

Wet ball milling conditions and PSD of Process Example 2

| Sample ID | Solvent | Milling time (hour) | PSD D50 (μm) | span |
|---|---|---|---|---|
| PEX2-B1 | Water | 4 | 4.3 | 1.3 |
| PEX2-B2 | Water | 15 | 2.4 | 0.9 |
| CPEX2-B1 | Acetone | 4 | 6.6 | 2.1 |
| CPEX2-B2 | Acetone | 15 | 4.6 | 1.9 |

It is observed that the samples milled with acetone as solvent have a higher D50 and span than those milled with water, indicating that water is a more interesting solvent than acetone.

CPEX2-B3 is prepared by the following procedure: PEX2-A is dry-milled by an ACM and named PEX2-A1. 2.4 kg of PEX2-A1 and 3.2 L of water are put on a 3.3 L slurry vessel. An ultrasound treatment of the slurry is performed using STH-1500S (from Sonictopia). The slurry is pumped into the ultrasound vessel, of which volume is 150 ml, with 2.5 L/min. The outlet of the ultrasound vessel is connected to the slurry vessel so that the slurry is circulated in the ultrasound treatment system. In the vessel, an ultrasound probe applies an output power of 1500 watt. The treatment is continued for an hour. The CPEX2-B3 has a D50 of 6.95 μm and a span of 2.0, which is much bigger than either PEX2-B1 or PEX2-B2. It indicates that an ultrasound treatment, which is a much more intensive treatment than normal washing by stirring, cannot separate agglomerated primary particle properly.

Process Example 3

This example illustrates that a conventional bead milling process is suitable for wet ball milling process in this invention. Wet bead-milled products (PEX3-B1, PEX3-B2, and PEX3-B3) are prepared by the following procedure: The jaw crushed large agglomerated compound PEX3-A is prepared by the same procedure like CEX1-A, except that the 2$^{nd}$ sintering temperature is 935° C. PEX3-A is then drymilled by ACM and labelled PEX3-B. 2 kg of PEX3-B and 2 L of water are put in a 5 L plastic beaker. The mixed slurry is continuously stirred by an overhead stirrer. The beaker is connected to the inlet and outlet of a continuous-type wet bead milling system (KM-FM from Dae-Wha Tech). As shown in FIG. 2, the bead mill system has a 0.9 L (fixed) chamber (201), rotating agitators with a length of 58 mm (206), 2.4 kg of 1 mm ZrO$_2$ beads (202) in the chamber, and a pump to inject the slurry to the chamber. The slurry is continuously injected with the flow rate of 2 L per minute into the bead mill chamber. The agitator is rotated with a tip speed of 300 cm/s. The slurry passing the chamber is collected in the same 5 L plastic beaker. The process is continued before achieving the target PSD of the slurry. Table 8 shows the milling time and PSD of the milled products PEX3-B1 to -B3 with PEX3-B as counterexample. The wet bead milling with relatively high milling speed and small ball size can achieve the desirable PSD in a short time (10 minutes).

TABLE 8

The bead milling conditions and PSD of Process Example 3

| Sample ID | Milling time (minute) | PSD D50 (μm) | span |
|---|---|---|---|
| PEX3-B | | 10.2 | 1.5 |
| PEX3-B1 | 10 | 5.0 | 1.2 |
| PEX3-B2 | 20 | 4.4 | 1.2 |
| PEX3-B3 | 30 | 4.1 | 1.2 |

Process Example 4

In this example the in-situ surface treatment during wet ball milling is demonstrated. Wet bead milled products (PEX4-B1) and in-situ Co coated products (PEX4-B2) are prepared by the following procedure: 3 kg of CEX1-B1 and 2 L of water are put in a 5 L plastic beaker. The mixed slurry is continuously stirred by an overhead stirrer. The beaker is connected to the inlet and outlet of a continuous-type wet bead milling system (KM-FM from Dae-Wha Tech).

As shown in FIG. 2, the bead mill system has a 0.9 L (fixed) chamber (201), rotating agitators with a length of 58 mm (206), 2.4 kg of 1 mm $ZrO_2$ beads (202) in the chamber, and a pump to inject the slurry to the chamber. The slurry is continuously injected with the flow rate of 2 L per minute into the bead mill chamber. The agitator is rotated with a tip speed of 300 cm/s. The slurry passing the chamber is collected in the same 5 L plastic beaker. After 20 minutes, all slurry passing the chamber is collected and the wet milled solid power is separated from water by using a Buchner filter. The filtered wet milled compound is dried at 80° C. in a conventional oven with dry air and labelled PEX4-B1. PEX4-B2 is prepared by same procedure like PEX4-B1 except that 150 ml of 2M (mol/L) $CoSO_4$ solution is added together with 3 kg of CEX1-B1 and 2 L of water in the 5 L plastic beaker.

Table 9 shows the PSD and ICP result of the milled products PEX4-B1 and in-situ coated product PEX4-B2.

TABLE 9

PSD and ICP result of Process Example 4

| Sample ID | PSD D50 (μm) | span | ICP Ni/M' | Mn/M' mol/mol in % | Co/M' |
|---|---|---|---|---|---|
| PEX4-B1 | 4.2 | 1.0 | 62.0 | 17.9 | 20.1 |
| PEX4-B2 | 4.2 | 1.0 | 61.6 | 17.7 | 20.7 |

The amount of $CoSO_4$ added in the process of PEX4-B2 is 1.0 mol %, which means that the molar ratio of Co in the $CoSO_4$ solution and M' (Ni, Mn, and Co) in CEX1-B1 is 1.0%. The ICP result and PSD of PEX4-B1 and PEX4-B2 indicates that 0.8 mol % from the 1.0 mol % Co is precipitated on the surface of PEX4-B2 without changing particle size distribution.

Process Example 5

This example illustrates that the milling speed is one of the main control parameters in the wet ball milling process. Wet bead milled products (PEX5-B1, PEX5-B2, and PEX5-B3) are prepared by the same procedure like PEX3-B2 except the milling speed described in Table 10.

TABLE 10

The bead milling conditions and PSD of Process Example 5

| Sample ID | Milling speed (cm/s) | PSD D50 (μm) | span | Volume below 1 μm (%) |
|---|---|---|---|---|
| PEX5-B1 | 200 | 5.2 | 1.1 | 0.0 |
| PEX3-B2 | 300 | 4.4 | 1.2 | 1.0 |
| PEX5-B2 | 450 | 3.8 | 1.3 | 1.1 |
| PEX5-B3 | 600 | 3.2 | 1.4 | 3.9 |

The wet ball milling time of four samples in Table 10 is 20 minutes for 2 kg powder. As the milling speed increases, the D50 decreases and the span increases. It means that high milling speed achieves the milling faster whilst compromising on span due to the creation of fine particles. The accumulated volume below 1 μm obtained by the PSD measurement can be used as a criterion indicating the creation of fine particles which are not desirable. The volume below 1 μm rapidly increases when milling RPM is 600 cm/s (PEX5-B3). Therefore, the milling speed of the final wet ball milling is preferred to be less than 500 cm/s.

The invention claimed is:

1. A method for preparing a powderous positive electrode material comprising single crystal monolithic particles comprising Ni and Co and having a general formula $Li_{1+a}$ (($Ni_z$ ($Ni_{1/2}$ $Mn_{1/2}$)$_y$ $Co_x$)$_{1-k}$ $A_k$)$_{1-a}$ $O_2$, wherein A is a dopant, $-0.03 \leq a \leq 0.06$, $0.05 \leq x \leq 0.35$, $0.10 \leq z \leq 0.95$, $x+y+z=1$ and $k \leq 0.05$, the method comprising the steps of:
   providing a mixture comprising a Ni- and Co- bearing precursor and a Li bearing precursor,
   subjecting the mixture to a multiple step sintering process whereby in the final sintering step a sintered lithiated intermediate material is obtained comprising agglomerated primary particles having a primary particle size distribution with a D50 between 2.0 and 8.0 μm,
   subjecting the lithiated intermediate material to a wet ball milling step whereby the agglomerated primary particles are deagglomerated and a slurry comprising deagglomerated primary particles is obtained,
   separating the deagglomerated primary particles from the slurry, and
   heat treating the deagglomerated primary particles at a temperature between 300° C. and at least 20° C. below the temperature in the final sintering step of the multiple step sintering process, whereby single crystal monolithic particles comprising Ni and Co are obtained.

2. The method according to claim 1, wherein the Ni- and Co- bearing precursor has a particle size distribution with a D50≥10 μm.

3. The method according to claim 1, wherein the Ni- and Co- bearing precursor is obtained from a pyrolysis process of a Ni- and Co- bearing sulfate or chloride solution.

4. The method according to claim 1, wherein in the mixture comprising a Ni- and Co- bearing precursor and a Li bearing precursor, the Li to transition metal ratio is between 0.65 and 0.95, and the multiple step sintering process comprises the following steps:
   a first sintering step in an oxidizing atmosphere at a temperature between 650 and 850° C., for a time between ⅓ and 15 hours, thereby obtaining a lithium deficient precursor powder, mixing the lithium deficient precursor powder with one of LiOH, $Li_2O$ or $LiOH \cdot H_2O$, thereby obtaining a second mixture whereby the mixture has a Li to transition metal ratio between 0.95 and 1.10, and sintering the second mixture in an oxidizing atmosphere at a temperature between 800 and 1000° C., for a time between 6 and 36 hours.

5. The method according to claim 1, further comprising a dry milling-step performed in an air classifying mill or an air jet mill between the step of subjecting the mixture to a multiple step sintering process and the wet ball milling step.

6. The method according to claim 1, wherein the wet ball milling step is performed in a solution with the solvent in the solution being water.

7. The method according to claim 1, wherein the wet ball milling step is performed in a solution comprising a solvent and between 30 and 70 wt % of lithiated intermediate material, and using one of steel, $ZrO_2$, $Al_2O_3$ or WC beads having a diameter between 0.5 and 10 mm.

8. The method according to claim 6, wherein the wet ball milling step is a cascade wet-milling step performed using one of steel, $ZrO_2$, $Al_2O_3$ or WC beads, the cascade wet ball milling step comprising a first step using beads of 10 to 50 mm and a milling speed <20 cm/s, and a final step using beads of 0.2 to 5 mm and a milling speed <500 cm/s.

9. The method according to claim 1, wherein the wet ball milling step is performed until achieving a slurry comprising deagglomerated primary particles with a D50 between 2 and 8 μm and a span below 1.3.

10. The method according to claim 1, wherein the heat treatment step of the deagglomerated primary particles is performed at temperature between 300 and 850° C.

11. The method according to claim 1, wherein in the wet ball milling step, a dopant A-bearing precursor or a Co-bearing precursor is added to the solution.

12. The method according to claim 11, wherein the dopant A- or Co- bearing precursor is one of aluminum or cobalt hydroxide, $CoSO_4$, $Al_2(SO_4)_3$ or $NaAl(OH)_4$.

13. The method according to claim 11, wherein the Co-bearing precursor is a Co-nano oxide or a cobalt salt, and the dopant A-bearing precursor is a nano oxide or salt of one or more of Al, Mg, Zr, Nb, Si, P, Mo, Ba, Sr, Ca, Zn, Cr, V, and Ti.

14. The method according to claim 1, wherein the deagglomerated primary particles separated from the slurry are dry coated with nano particles comprising one of $Al(OH)_3$, $Al_2O_3$, Co nitrate or a Mn doped Co oxide, before the heat treatment step.

* * * * *